(12) United States Patent
Arakawa et al.

(10) Patent No.: US 11,055,803 B2
(45) Date of Patent: Jul. 6, 2021

(54) VEHICLE DISPATCH MANAGEMENT DEVICE AND STORAGE MEDIUM

(71) Applicant: TOYOTA JIDOSHA KABUSHIKI KAISHA, Toyota (JP)

(72) Inventors: Seiji Arakawa, Sunto-gun (JP); Naotoshi Kadotani, Sunto-gun (JP); Junya Watanabe, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 16/204,538

(22) Filed: Nov. 29, 2018

(65) Prior Publication Data
US 2019/0197648 A1   Jun. 27, 2019

(30) Foreign Application Priority Data

Dec. 26, 2017   (JP) .............................. JP2017-249556

(51) Int. Cl.
*G06Q 50/30*    (2012.01)
*G05D 1/00*     (2006.01)
*G06Q 10/06*    (2012.01)

(52) U.S. Cl.
CPC .......... *G06Q 50/30* (2013.01); *G05D 1/0027* (2013.01); *G06Q 10/06315* (2013.01); *G05D 1/0088* (2013.01)

(58) Field of Classification Search
CPC .............. G05D 1/0027; G05D 1/0088; G06Q 10/06315; G06Q 50/30
USPC ....................................................... 705/7.25
See application file for complete search history.

(56) References Cited

U.S. PATENT DOCUMENTS

| | | | |
|---|---|---|---|
| 9,256,852 B1 | 2/2016 | Myllymaki | |
| 9,424,752 B1 | 8/2016 | Bonawitz | |
| 9,547,309 B2 | 1/2017 | Ross et al. | |
| 10,496,090 B2 * | 12/2019 | Latotzki | B60W 60/0057 |
| 2016/0364812 A1 | 12/2016 | Cao | |
| 2017/0219373 A1 * | 8/2017 | DiMeo | G01C 21/3469 |
| 2017/0329331 A1 * | 11/2017 | Gao | B60W 50/0098 |
| 2018/0081374 A1 * | 3/2018 | Nimchuk | G06Q 10/02 |

(Continued)

FOREIGN PATENT DOCUMENTS

| | | |
|---|---|---|
| JP | 2003123181 A | 4/2003 |
| JP | 2015-026265 A | 2/2015 |

(Continued)

*Primary Examiner* — Folashade Anderson
(74) *Attorney, Agent, or Firm* — Sughrue Mion, PLLC

(57) ABSTRACT

A vehicle dispatch management device includes an option presentation unit configured to present an option of whether or not a purpose of use of an autonomous driving vehicle is to take a rest within a vehicle to a user who requests dispatch of the autonomous driving vehicle, an option reception unit configured to receive the option selected by the user, and a feature information presentation unit configured to present first information representing a first feature of the vehicle as a dispatch vehicle candidate to the user when the option reception unit receives the option indicating that the purpose of use is not to take a rest within the vehicle, and presents second information representing a second feature of the vehicle as the dispatch vehicle candidate to the user when the option reception unit receives the option indicating that the purpose of use is to take a rest within the vehicle.

3 Claims, 18 Drawing Sheets

(56) References Cited

U.S. PATENT DOCUMENTS

| | | | | |
|---|---|---|---|---|
| 2018/0339714 A1* | 11/2018 | Smid | ................. | B60W 50/0097 |
| 2020/0150667 A1* | 5/2020 | Rakshit | .............. | A61B 5/14532 |
| 2020/0383580 A1* | 12/2020 | Shouldice | ............ | A61B 5/0205 |
| 2021/0024100 A1* | 1/2021 | Calleija | ........... | B60W 60/00253 |

FOREIGN PATENT DOCUMENTS

| | | |
|---|---|---|
| JP | 2015-092327 A | 5/2015 |
| JP | 2015-179331 A | 10/2015 |
| JP | 3211428 U | 7/2017 |

* cited by examiner

VEHICLE DISPATCH MANAGEMENT DEVICE AND STORAGE MEDIUM

CROSS-REFERENCE TO RELATED APPLICATION

This application claims the benefit of priority from Japanese Patent Application No. 2017-249556, filed Dec. 26, 2017, the entire contents of which are incorporated herein by reference.

TECHNICAL FIELD

The disclosure relates to a vehicle dispatch management device and a storage medium.

BACKGROUND

Japanese Unexamined Patent Publication No. 2015-26265 discloses a device that suggests that a user stays in an accommodation without going home by presenting information regarding an accommodation near a car station to the user when the user intends to use a shared car in order to go home, in car sharing.

SUMMARY

Incidentally, in a service that dispatches an autonomous driving vehicle to the user, information requested by the user is different depending on the purpose of use of the autonomous driving vehicle to be dispatched in some cases. Accordingly, in the present technical field, there is a demand for a vehicle dispatch management device capable of presenting information to the user depending on the purpose of use of the autonomous driving vehicle to be dispatched.

A vehicle dispatch management device according to an aspect of the disclosure includes an option presentation unit configured to present an option of whether or not a purpose of use of an autonomous driving vehicle is to take a rest within a vehicle to a user who requests dispatch of the autonomous driving vehicle, an option reception unit configured to receive the option selected by the user, and a feature information presentation unit configured to present first information representing a first feature of the autonomous driving vehicle as a dispatch vehicle candidate to the user when the option reception unit receives the option indicating that the purpose of use is not to take a rest within the vehicle, and presents second information representing a second feature of the autonomous driving vehicle as the dispatch vehicle candidate to the user when the option reception unit receives the option indicating that the purpose of use is to take a rest within the vehicle.

According to the vehicle dispatch management device, the information presented to the user when the purpose of use of the autonomous driving vehicle for which the user requests the vehicle dispatch is not to take a rest within the vehicle and the information presented to the user when the purpose of use of the autonomous driving vehicle for which the user requests the vehicle dispatch is to take a rest within the vehicle are different from each other. Thus, the vehicle dispatch management device can present the information to the user depending on the purpose of use of the autonomous driving vehicle to be dispatched.

In the vehicle dispatch management device, the first information may be information representing a feature regarding autonomous driving of the autonomous driving vehicle, and the second information may be information representing a feature regarding a case where the user takes a rest within the autonomous driving vehicle. Therefore, when the purpose of use of the autonomous driving vehicle is not to take a rest within the vehicle, the vehicle dispatch management device can present the information representing the feature regarding the autonomous driving of the autonomous driving vehicle to the user. Accordingly, the user who requests the dispatch of the autonomous driving vehicle in order not to take a rest within the vehicle and in order to simply move can select the autonomous driving vehicle to be dispatched while referring to the feature regarding the autonomous driving of each autonomous driving vehicle. Meanwhile, when the purpose of use of the autonomous driving vehicle is to take a rest within the vehicle, the vehicle dispatch management device can present the information representing the feature regarding the case where the purpose of use is to take a rest within the autonomous driving vehicle to the user. Accordingly, the user who requests the dispatch of the autonomous driving vehicle in order to take a rest within the vehicle can select the autonomous driving vehicle to be dispatched while referring the feature regarding the case where the purpose of use is to take a rest within each autonomous driving vehicle. Thus, the vehicle dispatch management device can present the information requested by the user to the user depending on the purpose of use of the autonomous driving vehicle to be dispatched.

A storage medium according to an aspect of the disclosure is a non-transitory computer-readable storage medium configured to store a vehicle dispatch management program, the vehicle dispatch management program executed by an server connected so as to communicate with a user terminal, wherein the vehicle dispatch management program causes the server to function as an option presentation unit configured to transmits information regarding an option of whether or not a purpose of use of an autonomous driving vehicle is to take a rest within a vehicle to the user terminal that transmits a vehicle dispatch request of the autonomous driving vehicle, an option reception unit configured to receive information regarding the option selected by the user from the user terminal, and a feature information presentation unit configured to transmits first information representing a first feature of the autonomous driving vehicle as a dispatch vehicle candidate to the user terminal when the option reception unit receives information regarding the option indicating that the purpose of use is not to take a rest within the vehicle from the user terminal, and transmits second information representing a second feature of the autonomous driving vehicle as the dispatch vehicle candidate to the user terminal when the option reception unit receives information regarding the option indicating that the purpose of use is to take a rest within the vehicle from the user terminal.

The storage medium have the same effects of the vehicle dispatch management device.

According to various aspects of the disclosure, it is possible to present the information to the user depending on the purpose of use of the autonomous driving vehicle to be dispatched.

DETAILED DESCRIPTION

Figure 1:
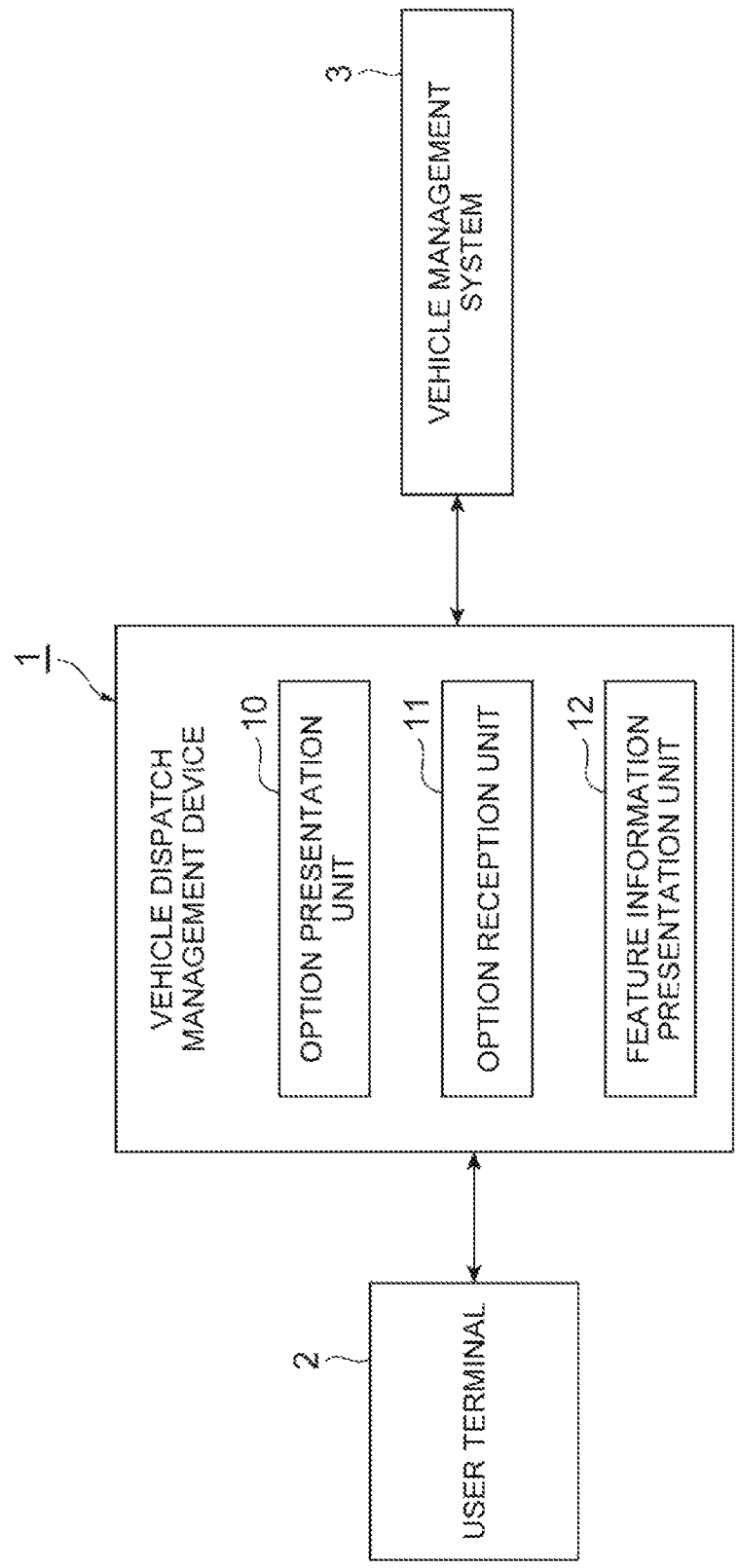
FIG. 1 is a block diagram showing a vehicle dispatch management device according to the present embodiment.

Hereinafter, illustrative embodiments will be described with reference to the drawings. The same or equivalent parts in the drawings will be assigned the same reference numerals, and the redundant description thereof will be omitted.

Embodiment

FIG. 1 is a block diagram showing a vehicle dispatch management device 1 according to the present embodiment. The vehicle dispatch management device 1 shown in FIG. 1 is a device that manages vehicle dispatch information of an autonomous driving vehicle for a user. The "autonomous driving vehicle" is a vehicle that is able to automatically travel toward a preset destination. The autonomous driving vehicle does not need to be driven by a driver, and automatically travels based on a traveling plan. For example, the "vehicle dispatch information" of the autonomous driving vehicle includes a current position of the autonomous driving vehicle, the purpose of use of the dispatch vehicle, and the current and next vehicle dispatch schedules.

The vehicle dispatch management device 1 is connected so as to communicate with a plurality of user terminals 2 and a vehicle management system 3 via a communication network. When a vehicle dispatch request is received from the user through the user terminal 2, the vehicle dispatch management device 1 dispatches the autonomous driving vehicle by using the vehicle management system 3 according to the vehicle dispatch request. The vehicle dispatch management device 1 dispatches the autonomous driving vehicle by using the vehicle management system 3 in order to take a rest within the vehicle depending on the request of the user.

The "user takes a rest within the vehicle" means that the user takes a rest or stays within the autonomous driving vehicle. More specifically, the "user takes a rest within the vehicle" may mean that the user takes a rest or stays within the autonomous driving vehicle while the user is moving to the final destination using the dispatched autonomous driving vehicle or before and after the user is moving by using the dispatched autonomous driving vehicle. Alternatively, the "user takes a rest within the vehicle" may mean that the user takes a rest or stays within the autonomous driving vehicle instead of taking a rest or staying in a building such as the home or accommodation (for example, a hotel or the like). Here, the "user takes a rest or stays" within the autonomous driving vehicle may be an aspect in which the user takes a rest or stays in a state in which the autonomous driving vehicle stops in a safe place, for example, a parking lot.

The "dispatch of the autonomous driving vehicle in order to take a rest within the vehicle" may mean that the autonomous driving vehicle is dispatched for every hour (that is, pay by the hour). In this case, the dispatch of the autonomous driving vehicle in order to take a rest within the vehicle may be the dispatch of the autonomous driving vehicle for which a use time is determined or the dispatch of the autonomous driving vehicle for which a use fee is charged depending on the use time. In contrast, "dispatch of the autonomous driving vehicle in order not to take a rest within the vehicle" may mean the dispatch of the autonomous driving vehicle in order to simply move, or may be the dispatch of the autonomous driving vehicle for every distance (that is, pay by the distance). In this case, the "dispatch of the autonomous driving vehicle in order not to take a rest within the vehicle" may be the dispatch of the autonomous driving vehicle for which the use distance is determined or the dispatch of the autonomous driving vehicle for which the use fee is charged depending on the use distance.

The user terminal 2 includes an input device that receives various information items from the user and an output device that outputs various information items through image display or voice output. The user terminal 2 receives information from the user through the input device, and transmits the input information to the vehicle dispatch management device 1. The user terminal 2 receives the information from the vehicle dispatch management device 1, and outputs the content of the received information through the output device. For example, the user terminal 2 is a mobile information terminal including a smartphone or a tablet computer.

The vehicle management system 3 is a system that manages vehicle information items of a plurality of autonomous driving vehicles to be dispatched for the user, and is constituted by, for example, a server. The "vehicle information" is information regarding a feature of the autonomous driving vehicle. The vehicle information is information representing the feature regarding the autonomous driving of the autonomous driving vehicle and information representing a feature regarding a case where the purpose of use is to take a rest within the autonomous driving vehicle. The vehicle management system 3 includes a vehicle database that stores the vehicle information items of the plurality of autonomous driving vehicles. For example, when the vehicle dispatch request from the user is received through the vehicle dispatch management device 1, the vehicle management system 3 dispatches the autonomous driving vehicle corresponding to the vehicle dispatch request for the user. The purpose of use of the autonomous driving vehicle by the user is set in the vehicle dispatch request from the user.

Figure 2:
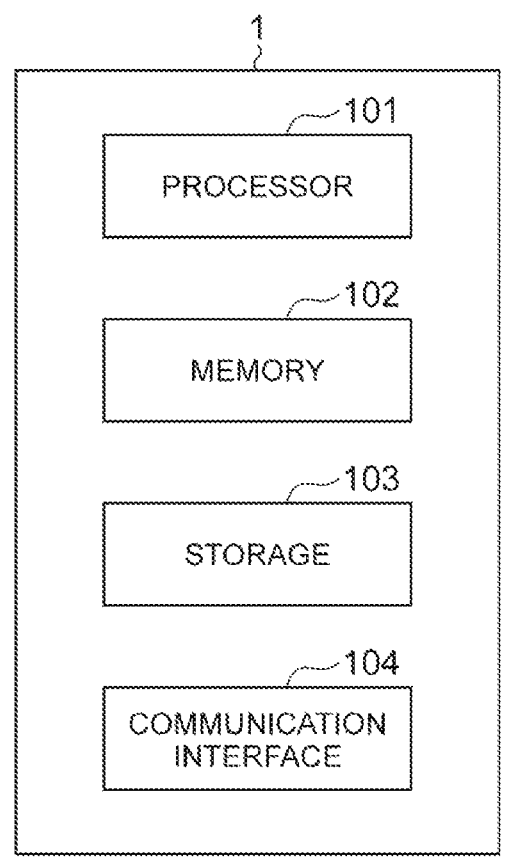
FIG. 2 is a diagram showing an example of a hardware configuration of a vehicle dispatch management device.

FIG. 2 is a diagram showing an example of a hardware configuration of the vehicle dispatch management device 1. As shown in FIG. 2, the vehicle dispatch management device 1 includes a processor 101, a memory 102, a storage 103, and a communication interface 104, and is a general server (computer). The vehicle dispatch management device 1 may include a plurality of servers. For example, the vehicle dispatch management device 1 includes an electronic control unit (ECU) that generally controls the device. The ECU is an electronic control unit having a central processing unit (CPU), a read-only memory (ROM), and a random-access memory (RAM). For example, the ECU loads a program stored in the ROM into the RAM, and executes the program loaded into the RAM by using the CPU. Thus, the ECU realizes the functions of the vehicle dispatch management device 1. The vehicle dispatch management device 1 may include a plurality of ECUs.

The vehicle dispatch management device 1 includes an option presentation unit 10, an option reception unit 11, and a feature information presentation unit 12.

The option presentation unit 10 presents an option of whether or not the purpose of use of the autonomous driving vehicle is to take a rest within the vehicle to a user who requests the dispatch of the autonomous driving vehicle. More specifically, when the vehicle dispatch request is received from the user through the user terminal 2, the option presentation unit 10 transmits information regarding the option of whether or not the purpose of use of the autonomous driving vehicle is take a rest within the vehicle to the user terminal 2, and outputs the content of the option through the output device. For example, the option of whether or not the purpose of use of the autonomous driving vehicle is to take a rest within the vehicle may be two including a case where the purpose of use is to take a rest within the vehicle or a case where the purpose of use is to simply move, or may be three or more including three options (for example, the purpose of use of the autonomous driving vehicle is to deliver freight).

The option reception unit 11 receives the option selected by the user. More specifically, as the option of whether or not the purpose of use of the autonomous driving vehicle is to take a rest within the vehicle, any option output through the output device is selected by the user, and information regarding the selected option is transmitted to the vehicle dispatch management device 1 from the user terminal 2. Accordingly, the option reception unit 11 receives the option selected by the user.

When the option selected by the user is received, the option reception unit 11 determines whether or not the option is an option indicating that the purpose of use of the autonomous driving vehicle is to take a rest within the vehicle. The option reception unit 11 outputs the determination result to the feature information presentation unit 12.

When the option indicating that the purpose of use is not to take a rest within the vehicle is received by the option reception unit 11, the feature information presentation unit 12 presents first information representing a first feature of the autonomous driving vehicle as the dispatch vehicle candidate to the user. More specifically, the feature information presentation unit 12 transmits the first information representing the first feature to the user terminal 2, and outputs the content of the first information through the output device. Meanwhile, when the option indicating that the purpose of use is to take a rest within the vehicle is received by the option reception unit 11, the feature information presentation unit 12 presents second information representing a second feature of the autonomous driving vehicle as the dispatch vehicle candidate to the user. More specifically, the feature information presentation unit 12 transmits the second information representing the second feature to the user terminal 2, and outputs the content of the second information through the output device. At this time, the vehicle dispatch management device 1 may access the vehicle database of the vehicle management system 3, and may obtain the first information and the second information included in the vehicle information of the autonomous driving vehicle.

The "autonomous driving vehicle as the dispatch vehicle candidate" is an autonomous driving vehicle capable of being dispatched among the autonomous driving vehicles that satisfy a condition corresponding to the vehicle dispatch request from the user. The autonomous driving vehicle as the dispatch vehicle candidate may be determined by the vehicle dispatch management device 1 based on the vehicle dispatch information managed by the vehicle dispatch management device 1 and the vehicle information managed by the vehicle management system 3. At this time, the vehicle dispatch management device 1 may access the vehicle database of the vehicle management system 3, and may obtain the vehicle information of the autonomous driving vehicle.

The first feature is a feature regarding the autonomous driving of the autonomous driving vehicle. That is, the first information is information representing a feature regarding the autonomous driving of the autonomous driving vehicle. The "information representing the feature regarding the autonomous driving" may be information regarding reliability of the autonomous driving of the autonomous driving vehicle. More specifically, the first information may be information regarding a version of the autonomous driving system mounted on each autonomous driving vehicle or may be information regarding the evaluation of the user for the autonomous driving of each autonomous driving vehicle.

The second feature is a feature regarding a case where the purpose of use is to take a rest within the autonomous driving vehicle. That is, the second information is information different from the first information. Specifically, the second information is information representing the feature regarding a case where the purpose of use is to take a rest within the autonomous driving vehicle. The "information representing the feature regarding the case where the purpose of use is to take a rest within the vehicle" may be information regarding comfortableness in taking a rest within the vehicle in the autonomous driving vehicle. More specifically, the second information may be information regarding a vehicle type (a minivan or a sedan) of each autonomous driving vehicle, may be information regarding equipment or furniture for taking a rest within the vehicle which is mounted on each autonomous driving vehicle, or may be information regarding a degree (luxury or convenience) of the interior of each autonomous driving vehicle.

Figure 3:
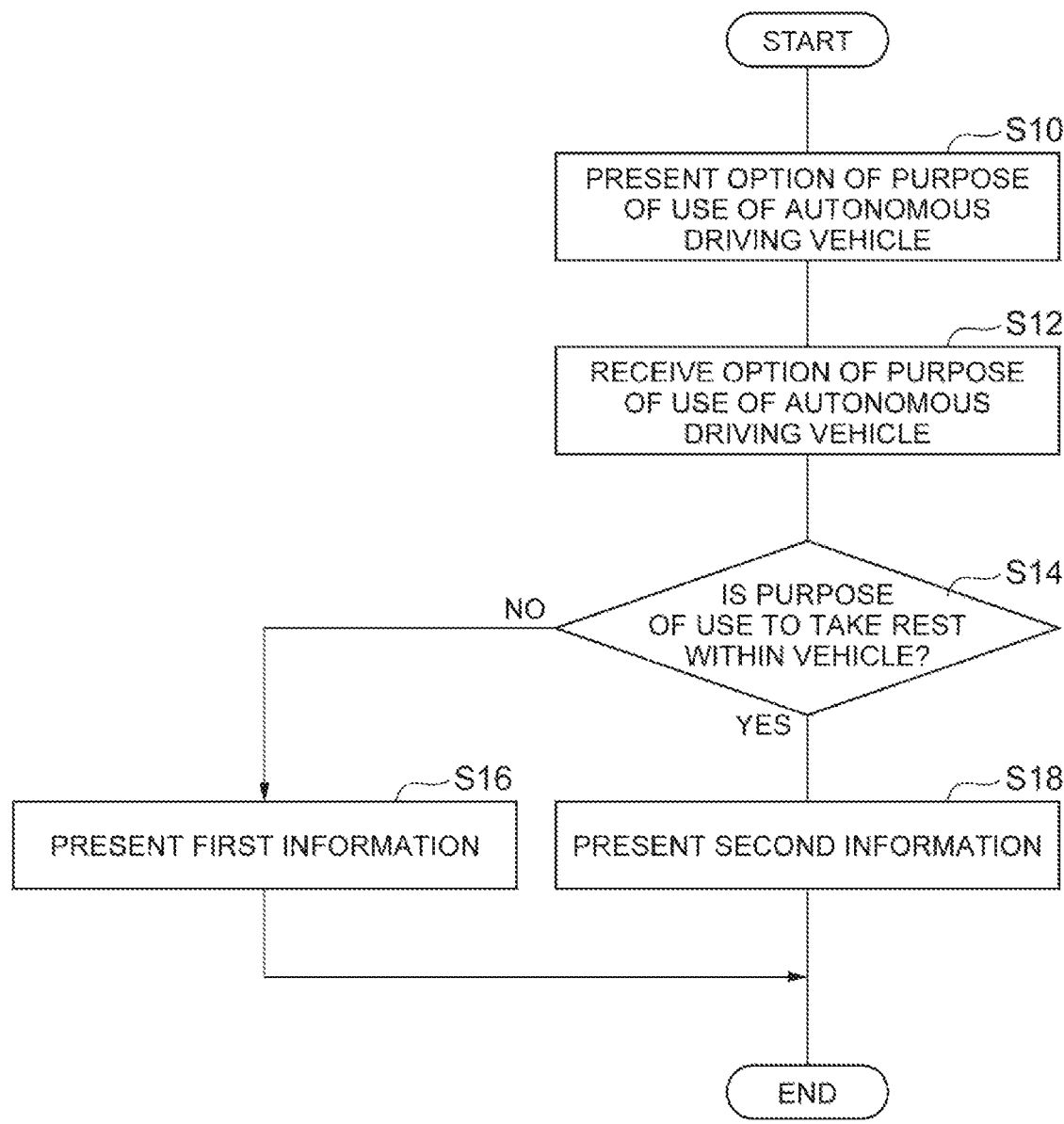
FIG. 3 is a flowchart showing a process performed by the vehicle dispatch management device according to the present embodiment.

Hereinafter, a process performed by the vehicle dispatch management device 1 will be described. FIG. 3 is a flowchart showing the process performed by the vehicle dispatch management device 1 according to the present embodiment. The flowchart of FIG. 3 is performed when the vehicle dispatch management device 1 receives the vehicle dispatch request for the autonomous driving vehicle from the user through the user terminal 2.

As shown in FIG. 3, in step S10, the option presentation unit 10 of the vehicle dispatch management device 1 transmits the information regarding the option of whether or not the purpose of use of the autonomous driving vehicle is to take a rest within the vehicle to the user terminal 2, and outputs the content of the option through the output device. Accordingly, the option presentation unit 10 presents the option of whether or not the purpose of use of the autonomous driving vehicle is to take a rest within the vehicle to the user who requests the dispatch of the autonomous driving vehicle. Thereafter, the vehicle dispatch management device 1 proceeds to step S12.

In step S12, any option output through the output device is selected by the user, and the information regarding the selected option is transmitted to the vehicle dispatch management device 1 from the user terminal 2. As a result, the option reception unit 11 of the vehicle dispatch management device 1 receives the option selected by the user. Subsequently, the vehicle dispatch management device 1 proceeds to step S14.

In step S14, the option reception unit 11 of the vehicle dispatch management device 1 determines whether or not the option selected by the user is the option indicating that the purpose of use of the autonomous driving vehicle is to take a rest within the vehicle. When the option reception unit determines that the option selected by the user is not the option indicating that the purpose of use of the autonomous driving vehicle is to take a rest within the vehicle (step S14: NO), the vehicle dispatch management device 1 proceeds to step S16. Meanwhile, when the option reception unit 11 determines that the option selected by the user is the option indicating that the purpose of use of the autonomous driving vehicle is to take a rest within the vehicle (step S14: YES), the vehicle dispatch management device 1 proceeds to step S18.

In step S16, the feature information presentation unit 12 of the vehicle dispatch management device 1 present the first information to the user by transmitting the first information which is the information representing the feature regarding the autonomous driving of the autonomous driving vehicle to the user terminal 2 and outputting the content of the first information through the output device. When the feature information presentation unit 12 presents the first information to the user, the vehicle dispatch management device 1 ends the process of this flowchart.

In step S18, the feature information presentation unit 12 of the vehicle dispatch management device 1 presents the second information to the user by transmitting the second information which is the information representing the feature regarding the case where the purpose of use is to take a rest within the autonomous driving vehicle to the user terminal 2 and outputting the content of the second information through the output device. When the feature information presentation unit 12 presents the second information to the user, the vehicle dispatch management device 1 ends of the process of this flowchart.

A vehicle dispatch management program includes a main module, an input module, and an arithmetic processing module. The main module is a module that generally controls an operation of the server. The input module operates the server so as to accept an input from the user from the user terminal 2. The arithmetic processing module is a module that performs the arithmetic processing. Functions realized by executing the main module, the input module, and the arithmetic processing module are the same as the functions of the vehicle dispatch management device 1. For example, the vehicle dispatch management program is provided by a non-transitory computer-readable storage medium such as a ROM or a semiconductor memory. The vehicle dispatch management program may be provided via a network.

As described above, in accordance with the vehicle dispatch management device 1, the information presented to the user when the purpose of use of the autonomous driving vehicle for which the user requests the vehicle dispatch is not to take a rest within the vehicle and the information presented to the user when the purpose of use of the autonomous driving vehicle for which the user requests the vehicle dispatch is to take a rest within the vehicle are different from each other. Thus, the vehicle dispatch management device 1 can present information to the user depending on the purpose of use of the autonomous driving vehicle to be dispatched.

In the vehicle dispatch management device 1, the first information is information representing the feature regarding the autonomous driving of the autonomous driving vehicle, and the second information is information representing the feature regarding the case where the purpose of use is to take a rest within the autonomous driving vehicle. Thus, when the purpose of use of the autonomous driving vehicle is to take a rest within the vehicle, the vehicle dispatch management device 1 can present the information representing the feature regarding the autonomous driving of the autonomous driving vehicle to the user. Accordingly, the user who requests the dispatch of the autonomous driving vehicle in order not to take a rest within the vehicle and in order to simply move can select the autonomous driving vehicle to be dispatched while referring to the feature regarding the autonomous driving of each autonomous driving vehicle. Meanwhile, when the purpose of use of the autonomous driving vehicle is to take a rest within the vehicle, the vehicle dispatch management device 1 can present the information representing the feature regarding the case where the purpose of use is to take a rest within the autonomous driving vehicle to the user. Accordingly, the user who requests the dispatch of the autonomous driving vehicle in order to take a rest within the vehicle can select the autonomous driving vehicle to be dispatched while referring the feature regarding the case where the purpose of use is to take a rest within each autonomous driving vehicle. Therefore, the vehicle dispatch management device 1 can present the information requested by the user to the user depending on the purpose of use of the autonomous driving vehicle to be dispatched.

The above-described embodiment can be performed in various aspects obtained by performing various changes and modifications based on the knowledge of those skilled in the art.

For example, the first information may be information that is beneficial to the user who requests the dispatch of the autonomous driving vehicle in order not to take a rest within the vehicle and in order to simply move, and may not be the information representing the feature regarding the autonomous driving of the autonomous driving vehicle. That is, the first feature may not be the feature regarding the autonomous driving of the autonomous driving vehicle. The second information may be information that is beneficial to the user who requests the dispatch of the autonomous driving vehicle in order to take a rest within the vehicle, and may not be the information representing the feature regarding the case where the purpose of use is to take a rest within the autonomous driving vehicle. That is, the second feature may not be the feature regarding the case where the purpose of use is to take a rest within the autonomous driving vehicle.

The first information may include the information which is beneficial to the user who requests the dispatch of the autonomous driving vehicle in order not to take a rest within the vehicle and in order to simply move (for example, the information representing the feature regarding the autonomous driving of the autonomous driving vehicle) and the information (common information) in common to the second information. The second information may include the information which is beneficial to the user who requests the dispatch of the autonomous driving vehicle in order to take a rest within the vehicle (for example, the information representing the feature regarding the case where the purpose of use is to take a rest within the autonomous driving vehicle) and the information (common information) in common to the first information.

The vehicle dispatch management device 1 may charge the user for the dispatch fee of the autonomous driving vehicle. In this case, for example, the fee may be set depending on a rank of each autonomous driving vehicle in association with the first information or the second information. In other words, each autonomous driving vehicle may be classified according to the first information or the second information, and the fee may be set for each classification. For example, the fee for each autonomous driving vehicle may be set such that the fee becomes higher as the rank becomes higher with the fee of the autonomous driving vehicle having the lowest rank as a reference. In this case, the fee of each autonomous driving vehicle may be classified into the autonomous driving vehicle having a low rank and the autonomous driving vehicle having an upper rank.

First Reference Embodiment

Figure 4:
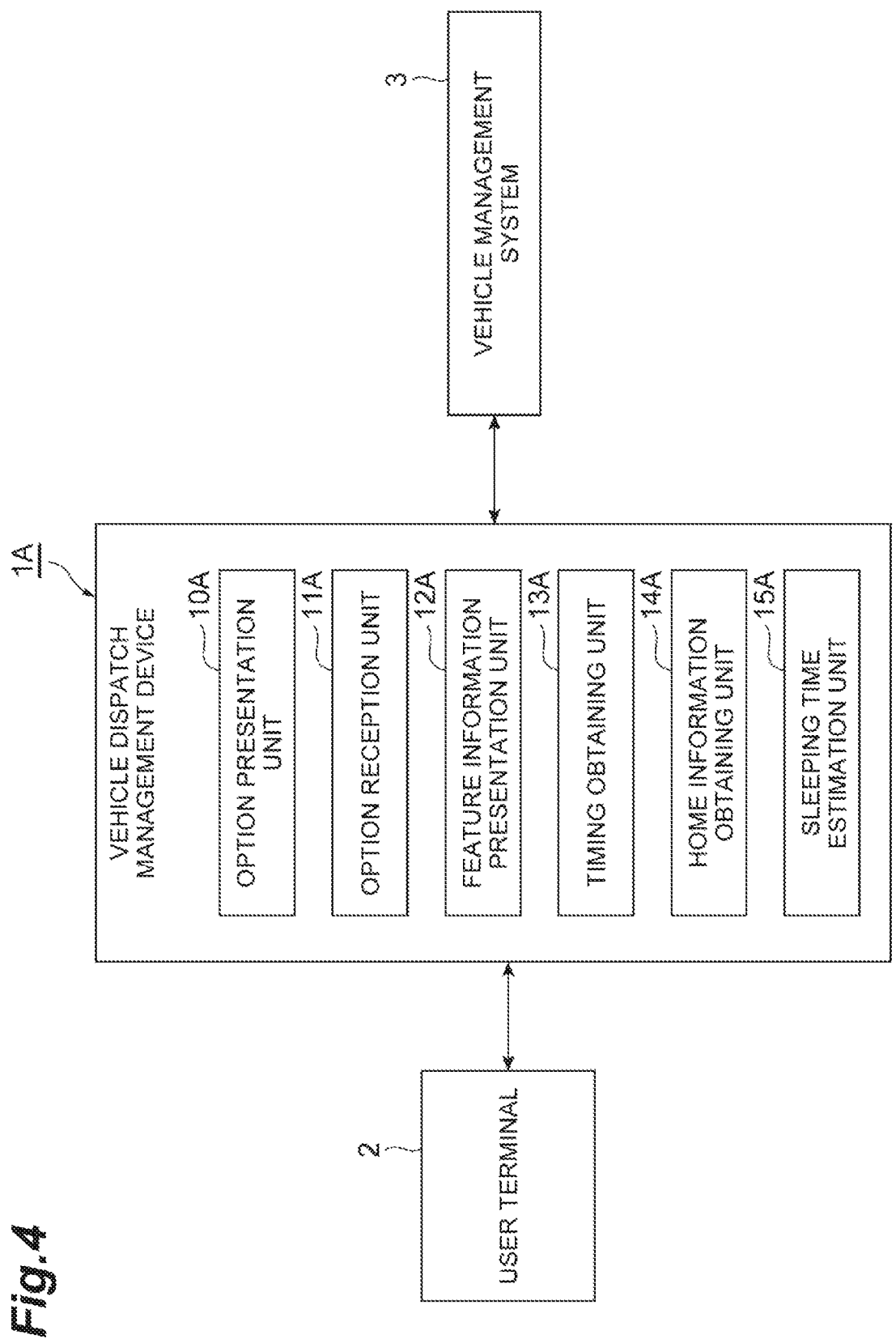
FIG. 4 is a block diagram showing a vehicle dispatch management device according to a first reference embodiment.

A vehicle dispatch management device 1A according to a first reference embodiment will be described. FIG. 4 is a block diagram showing a vehicle dispatch management device 1A according to the first reference embodiment. When the user tries to go home from the dispatched autonomous driving vehicle and the vehicle dispatch management device 1A shown in FIG. 4 estimates that the user will not secure a sufficient sleeping time after the user goes home, the vehicle dispatch management device 1A suggests that the user takes a rest within the vehicle.

The vehicle dispatch management device 1A includes an option presentation unit 10A, an option reception unit 11A, a feature information presentation unit 12A, a timing obtaining unit 13A, a home information obtaining unit 14A, and a sleeping time estimation unit 15A. The option reception unit 11A has the same function as that of the option reception unit 11. The feature information presentation unit 12A has the same function as that of the feature information presentation unit 12.

The option presentation unit 10A has the following function in addition to the same function as that of the option presentation unit 10. That is, the option presentation unit 10A presents an input screen of a destination of the movement when it is estimated that the purpose of use of the autonomous driving vehicle is not to take a rest within the vehicle and is to simply move. More specifically, the option presentation unit 10A transmits information regarding the input screen of the destination of the movement using the dispatched autonomous driving vehicle to the user terminal 2, and outputs (displays) the input screen through the output device. The aspect of the input screen is not particularly limited. For example, the input screen may be displayed as an aspect in which the destination is presented as an option, an aspect in which the destination is input as characters, or an aspect in which the destination is designated on a map. When it is not late at night or when it is estimated that the user will not secure a sufficient sleeping time after the user goes home, the option presentation unit 10A estimates that the purpose of use of the autonomous driving vehicle by the user is not to take a rest within the vehicle and is to simply move.

The timing obtaining unit 13A obtains timing information. The "timing information" may be a current timing. Alternatively, the "timing information" may be a timing when a vehicle dispatch management application is activated on the user terminal 2 when the vehicle dispatch management application for communicating with the vehicle dispatch management device 1A is installed on the user terminal 2 of the user. The timing obtaining unit 13A determines whether or not it is late at night based on the obtained timing information. The "late at night" may be a preset time zone or may be a time zone set for each user through machine learning (individual learning).

The home information obtaining unit 14A obtains home information of the user. The "home information" includes, for example, a home address. For example, the home information obtaining unit 14A may obtain the home information of the user by estimating that the home of the user is present at a point set in the destination of the movement using the dispatched autonomous driving vehicle a preset number of times or more at night based on use history information of the vehicle dispatch management application. Alternatively, when a schedule management application is installed on the user terminal 2 of the user, the home information obtaining unit 14A may obtain the home information of the user based on information registered in the schedule management application. Alternatively, when a mail transmission and reception application is installed on the user terminal 2 of the user, the home information obtaining unit 14A may obtain the home information of the user based on information regarding a mail transmitted and received by the mail transmission and reception application.

The sleeping time estimation unit 15A estimates a distance and a required time from a vehicle dispatch point of the autonomous driving vehicle to the home of the user based on the home information of the user obtained by the home information obtaining unit 14A. For example, the sleeping time estimation unit 15A may estimate the distance and the required time from the vehicle dispatch point of the autonomous driving vehicle to the home of the user based on a vehicle dispatch point included in the vehicle dispatch request received by the vehicle dispatch management device 1A from the user through the user terminal 2, a current position included in the vehicle dispatch information of the autonomous driving vehicle managed by the vehicle dispatch management device 1A, and a traveling environment from the vehicle dispatch point of the autonomous driving vehicle to the home of the user, in addition to the home information of the user obtained by the home information obtaining unit 14A. In this case, the sleeping time estimation unit 15A may obtain a traveling environment from the vehicle dispatch point of the autonomous driving vehicle to the home of the user by using any means. The "traveling environment" is an environment of a traveling route on which the autonomous driving vehicle travels on the traveling plan of the autonomous driving vehicle, and includes, for example, a restriction speed, a congestion situation, and a traffic regulation.

The sleeping time estimation unit 15A estimates whether or not the user can secure the sufficient sleeping time after the user goes home based on the distance and the required time from the vehicle dispatch point of the autonomous driving vehicle to the home of the user. For example, the sleeping time estimation unit 15A may estimate whether or not the user can secure the sufficient sleeping time after the user goes home based on the timing information obtained by the timing obtaining unit 13A in addition to the distance and the required time from the vehicle dispatch point of the autonomous driving vehicle to the home of the user.

The "user can secure the sufficient sleeping time after the user goes home: may mean that a time between a timing estimated that the user goes to bed after the user goes home and a timing estimated that the user wakes up is equal to or greater than a minimum sleeping time. The "minimum sleeping time" may be a time set in advance by the vehicle dispatch management device 1A or may be a time set in advance by the user. The sleeping time estimation unit 15A may obtain a time from when the user goes home and to when the user goes to bed by using any means or may obtain a timing when the user wakes up by using any means.

Figure 5:
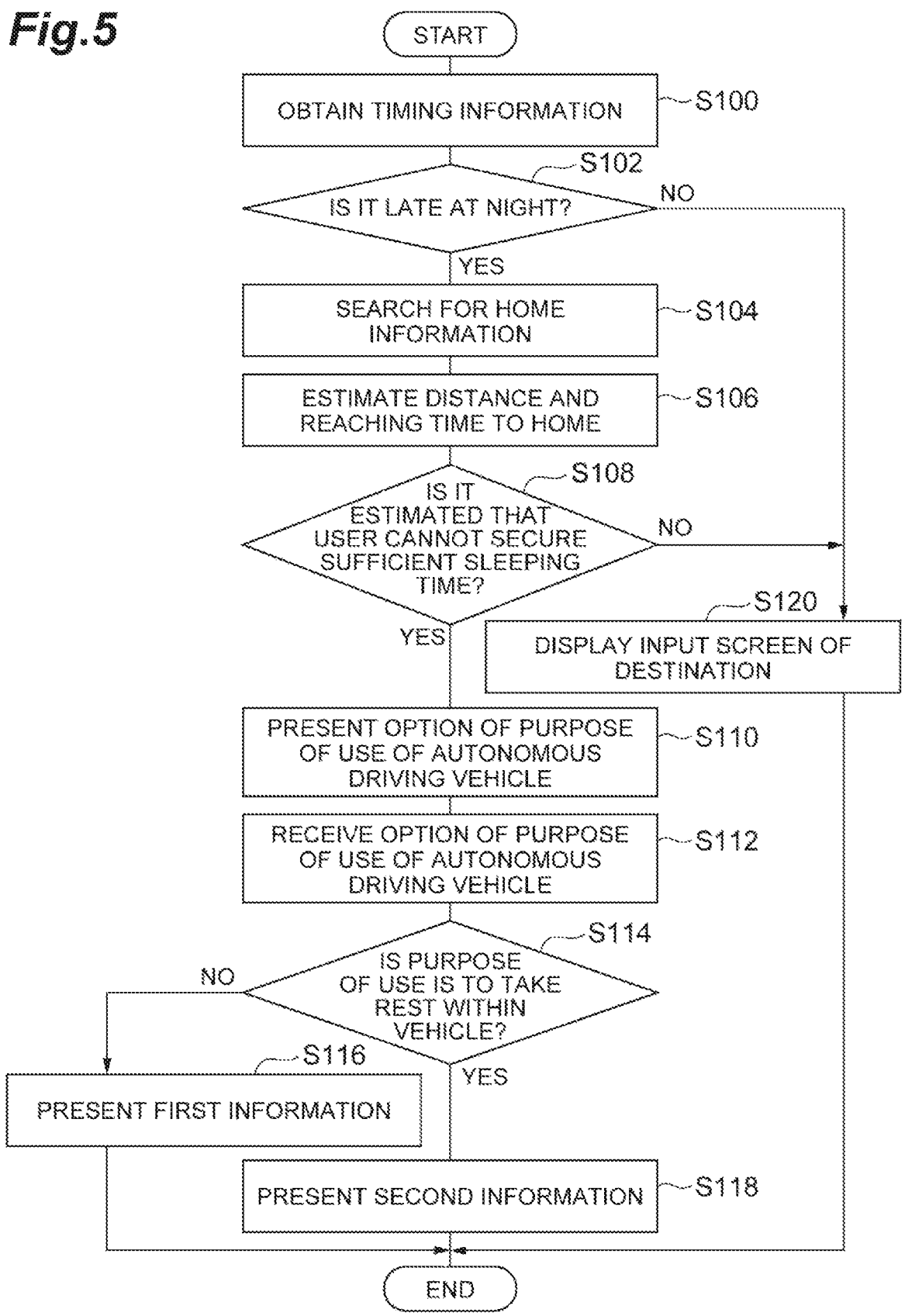
FIG. 5 is a flowchart showing a process performed by the vehicle dispatch management device according to the first reference embodiment.

Hereinafter, a process performed by the vehicle dispatch management device 1A will be described. FIG. 5 is a flowchart showing the process performed by the vehicle dispatch management device 1A according to the first reference embodiment. The flowchart of FIG. 5 is performed when the vehicle dispatch management device 1A receives the vehicle dispatch request for the autonomous driving vehicle from the user through the user terminal 2.

As shown in FIG. 5, in step S100, the timing obtaining unit 13A of the vehicle dispatch management device 1A obtains the timing information. Thereafter, the vehicle dispatch management device 1A proceeds to step S102.

In step S102, the timing obtaining unit 13A of the vehicle dispatch management device 1A determines whether or not it is late at night. When the vehicle dispatch management device determines that it is late at night (step S102: YES), the vehicle dispatch management device 1A proceeds to step S104. Meanwhile, when the vehicle dispatch management device does not determine that it is late at night (step S102: NO), the vehicle dispatch management device 1A proceeds to step S120.

In step S104, the home information obtaining unit 14A of the vehicle dispatch management device 1A obtains the home information of the user. Subsequently, the vehicle dispatch management device 1A proceeds to step S106.

In step S106, the sleeping time estimation unit 15A of the vehicle dispatch management device 1A estimates the distance and the required time from the vehicle dispatch point of the autonomous driving vehicle to the home of the user based on the home information of the user obtained by the home information obtaining unit 14A. Thereafter, the vehicle dispatch management device 1A proceeds to step S108.

In step S108, the sleeping time estimation unit 15A of the vehicle dispatch management device 1A estimates whether or not the user can secure the sufficient sleeping time after the user goes home based on the distance and the required time from the vehicle dispatch point of the autonomous driving vehicle to the home of the user. At this time, the sleeping time estimation unit 15A may estimate whether or not the user can secure the sufficient sleeping time after the user goes home based on a past vehicle dispatch history (the number of times of the use and use frequency) of the autonomous driving vehicle by the user who desires to stay within the vehicle. When the sleeping time estimation unit estimates that the user can secure the sufficient sleeping time after the user goes home (step S108: YES), the vehicle dispatch management device 1A proceeds to step S110. Meanwhile, when the sleeping time estimation unit does not estimate that the user can secure the sufficient sleeping time after the user goes home (step S108: NO), the vehicle dispatch management device 1A proceeds to step S120.

In steps S110 to S118, the vehicle dispatch management device 1A performs the same processes as those of steps S10 to step S18 in the flowchart of FIG. 3 of the vehicle dispatch management device 1 according to the embodiment. That is, the vehicle dispatch management device 1A performs the same process as that of step S10 in step S110, performs the same process as that of step S12 in step S112, performs the same process as that of step S14 in step S114, performs the same process as that of step S16 in step S116, and performs the same process as that of step S18 in step S118. When the process of step S116 or step S118 is performed, the vehicle dispatch management device 1A ends the process of this flowchart.

In step S120, the option presentation unit 10A of the vehicle dispatch management device 1A estimates that the purpose of use of the autonomous driving vehicle is not to take a rest within the vehicle and is to simply move, and presents the input screen of the destination of the movement. When the input screen of the destination of the movement is presented, the vehicle dispatch management device 1A ends the process of this flowchart.

As described above, in accordance with the vehicle dispatch management device 1A according to the first reference embodiment, when the user tries to go home by using the dispatched autonomous driving vehicle and it is estimated that the user cannot secure the sufficient sleeping time after the user goes home, the vehicle dispatch management device 1A can suggest that the user takes a rest within the vehicle.

Second Reference Embodiment

Figure 6:
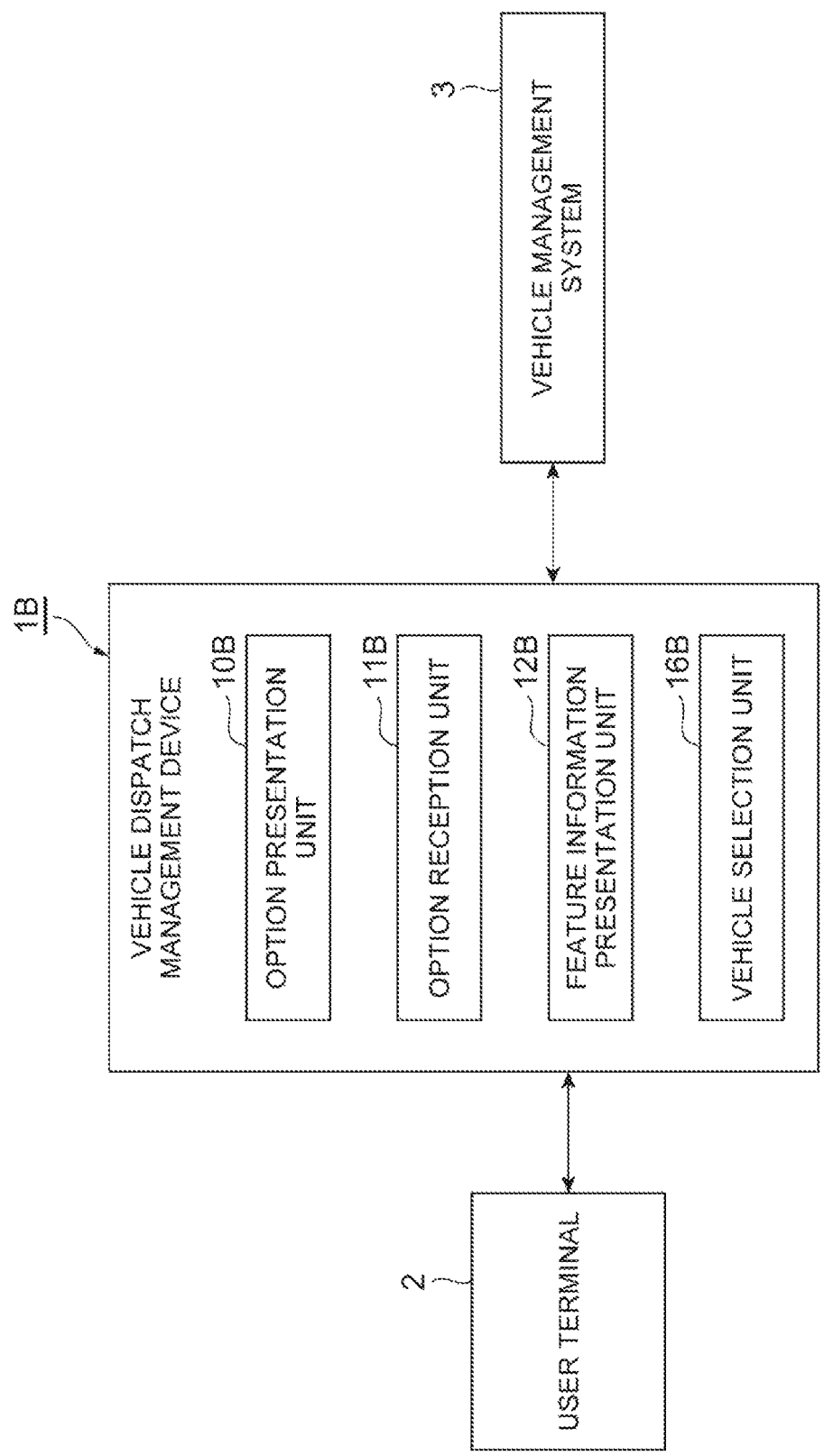
FIG. 6 is a block diagram showing a vehicle dispatch management device according to a second reference embodiment.

A vehicle dispatch management device 1B according to a second reference embodiment will be described. FIG. 6 is a block diagram showing the vehicle dispatch management device 1B according to the second reference embodiment. When the purpose of use of the autonomous driving vehicle for which the user requests the vehicle dispatch is to take a rest within the vehicle, the vehicle dispatch management device 1B shown in FIG. 6 selects the autonomous driving vehicle as the dispatch vehicle candidate from autonomous driving vehicles each having a toilet mode.

The vehicle dispatch management device 1B includes an option presentation unit 10B, an option reception unit 11B, a feature information presentation unit 12B, and a vehicle selection unit 16B. The option presentation unit 10B has the same function as that of the option presentation unit 10. The option reception unit 11B has the same function as that of the option reception unit 11.

When the option indicating that the purpose of use is not to take a rest within the vehicle is received by the option reception unit 11B, the feature information presentation unit 12B presents the first information representing the feature of the autonomous driving vehicle as the dispatch vehicle candidate to the user. Meanwhile, when the option reception unit 11B receives the option indicating that the purpose of use is to take a rest within the vehicle, the feature information presentation unit 12B presents the second information representing the feature of the autonomous driving vehicle as the dispatch vehicle candidate selected from the autonomous driving vehicles each having the toilet mode by the vehicle selection unit 16B to be described below to the user.

When the option reception unit 11B receives the option indicating that the purpose of use is not to take a rest within the vehicle, the vehicle selection unit 16B selects the autonomous driving vehicle as the dispatch vehicle candidate irrespective of whether or not the autonomous driving vehicle has the toilet mode. Meanwhile, when the option reception unit 11B receives the option indicating that the purpose of use is to take a rest within the vehicle, the vehicle selection unit 16B selects the autonomous driving vehicle as the dispatch vehicle candidate from the autonomous driving vehicles each having the toilet mode. The vehicle selection unit 16B stores toilet information in association with the map information in advance. The "toilet information" is information indicating a position and a use condition of a toilet that is available by the user. For example, the use condition includes an available time.

The "toilet mode" is a mode in which the autonomous driving vehicle automatically drives toward a certain toilet that is available by the user. The determination of whether or not each toilet is available by the user may be performed based on the toilet information stored by the vehicle selection unit 16B. For example, the toilet mode is started according to a request from the user. More specifically, a toilet button on the autonomous driving vehicle or the user terminal 2 is pressed by the user, and thus, the toilet mode may be started.

Figure 7:
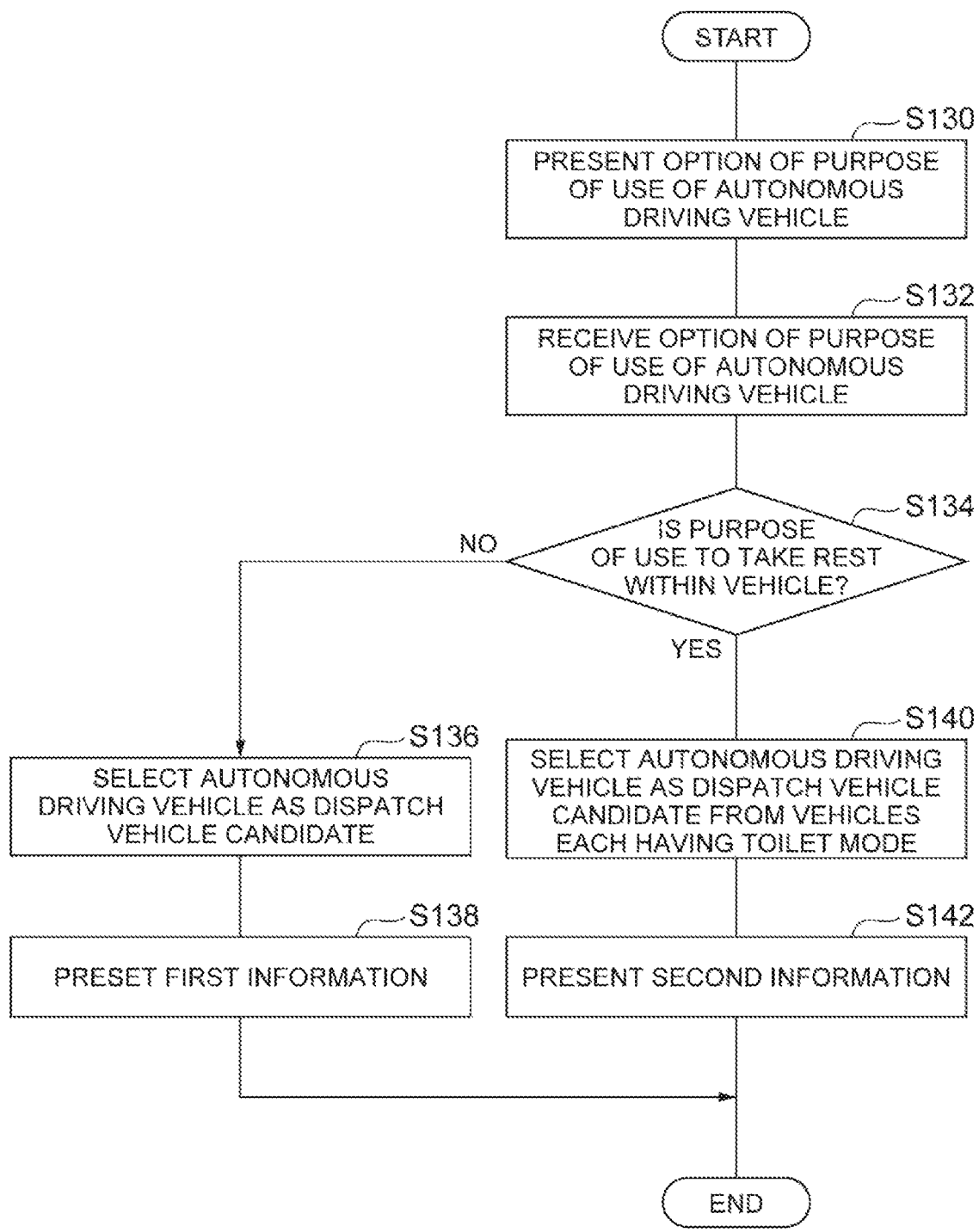
FIG. 7 is a flowchart showing a process performed by a vehicle dispatch management device according to the second reference embodiment.

Hereinafter, a process performed by the vehicle dispatch management device 1B will be described. FIG. 7 is a flowchart showing the process performed by the vehicle dispatch management device 1B according to the second reference embodiment. The flowchart of FIG. 7 is performed when the vehicle dispatch management device 1B receives the vehicle dispatch request for the autonomous driving vehicle from the user through the user terminal 2.

In steps S130 to S134, the vehicle dispatch management device 1B performs the same processes as those of steps S10 to S14 in the flowchart of FIG. 3 of the vehicle dispatch management device 1 according to the embodiment. That is, the vehicle dispatch management device 1B performs the same process as that of step S10 in step S130, performs the same process as that of step S12 in step S132, and performs the same process as that of step S14 in step S134. When the option reception unit determines that the option selected by the user is not the option indicating that the purpose of use of the autonomous driving vehicle is to take a rest within the vehicle in step S134 (step S134: NO), the vehicle dispatch management device 1B proceeds to step S136. Meanwhile, when the option reception unit determines that the option selected by the user is the option indicating that the purpose of use of the autonomous driving vehicle is to take a rest within the vehicle in step S134 (step S134: YES), the vehicle dispatch management device 1B proceeds to step S140.

In step S136, the vehicle selection unit 16B of the vehicle dispatch management device 1B selects the autonomous driving vehicle as the dispatch vehicle candidate irrespective of whether or not the autonomous driving vehicle has the toilet mode. Subsequently, the vehicle dispatch management device 1B proceeds to step S138.

In step S138, the vehicle dispatch management device LB performs the same process as that of step S16 in the flowchart of FIG. 3 of the vehicle dispatch management device 1 according to the embodiment. When the process of step S138 is performed, the vehicle dispatch management device 1B ends the process of this flowchart.

In step S140, the vehicle selection unit 16B of the vehicle dispatch management device 1B selects the autonomous driving vehicle as the dispatch vehicle candidate from the autonomous driving vehicles each having the toilet mode. Thereafter, the vehicle dispatch management device 1B proceeds to step S142.

In step S142, the vehicle dispatch management device 1B performs the same process as that of step S18 in the flowchart of FIG. 3 of the vehicle dispatch management device 1 according to the embodiment. When the process of step S142 is performed, the vehicle dispatch management device 1B ends the process of this flowchart.

As described above, in accordance with the vehicle dispatch management device 1B according to the second reference embodiment, when the purpose of use of the autonomous driving vehicle for which the user requests the vehicle dispatch is to take a rest within the vehicle, it is possible to select the autonomous driving vehicle as the dispatch vehicle candidate from the autonomous driving vehicles each having the toilet mode.

The vehicle dispatch management device 1B may select the autonomous driving vehicle as the dispatch vehicle candidate from autonomous driving vehicles each having a bath mode instead of the toilet mode. More specifically, the vehicle selection unit 16B may select the autonomous driving vehicle as the dispatch vehicle candidate from the autonomous driving vehicles each having the bath mode when the option reception unit 11B receives the option indicating that the purpose of use is to take a rest within the vehicle, and the feature information presentation unit 12B may present the second information representing the feature of the autonomous driving vehicle as the dispatch vehicle candidate selected from the autonomous driving vehicles each having the bath mode by the vehicle selection unit 16B to the user. In this case, the vehicle selection unit 16B stores bath information in association with the map information in advance. The "bath information" is information including a position and a use condition of a bath (for example, a public bath such as a bathhouse or a hot spring) that is available by the user. For example, the use condition includes an available time. The "bath mode" is a mode in which the autonomous driving vehicle automatically drives toward the bath that is available by the user. The determination of whether or not each bath is available by the user may be performed based on the bath information stored by the vehicle selection unit 16B in advance. For example, the bath mode is started according to a request from the user. More specifically, a bath button on the autonomous driving vehicle or the user terminal 2 is pressed by the user, and thus, the bath mode may be started.

Third Reference Embodiment

Figure 8:
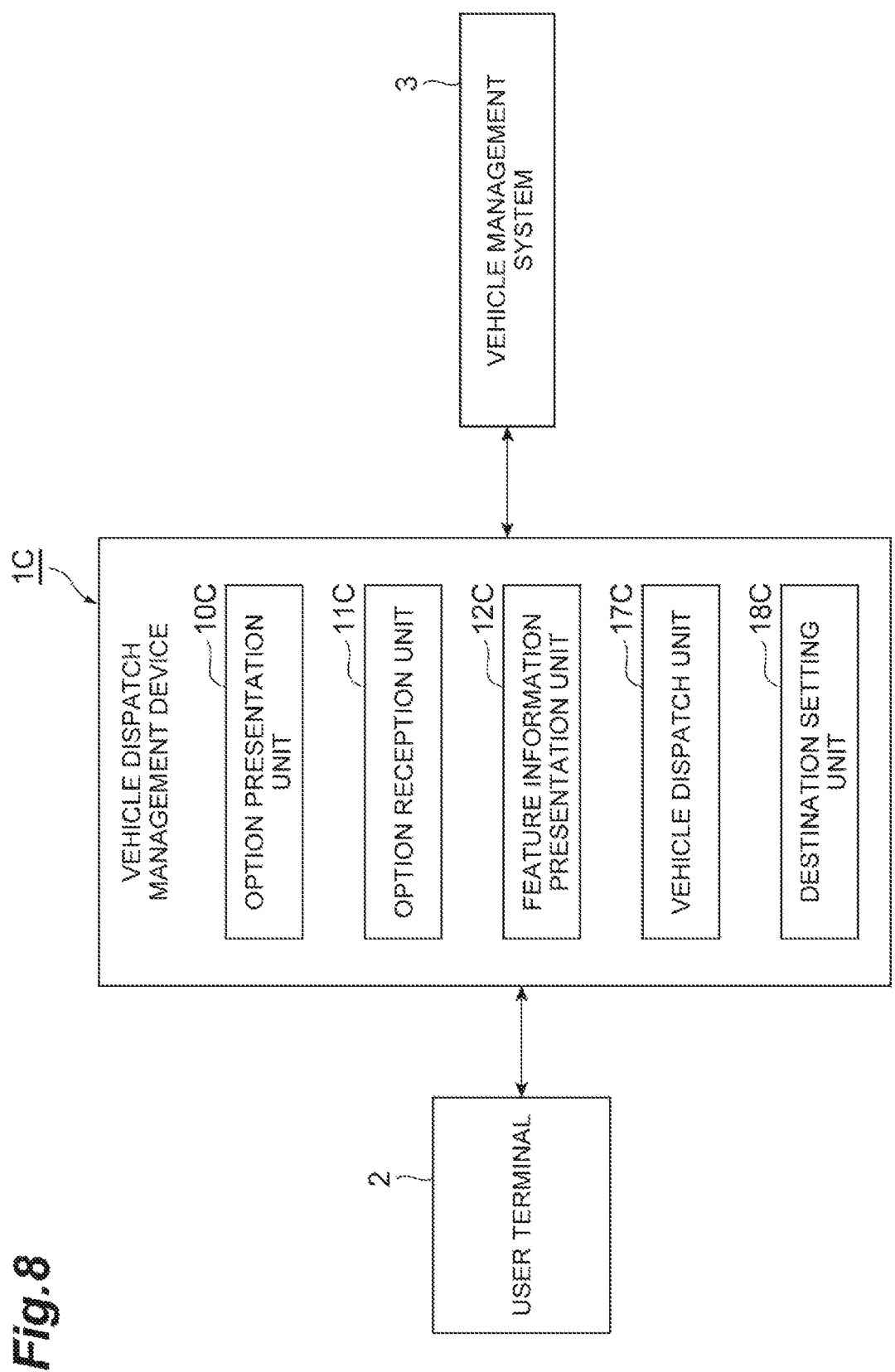
FIG. 8 is a block diagram showing a vehicle dispatch management device according to a third reference embodiment.

A vehicle dispatch management device 1C according to a third reference embodiment will be described. FIG. 8 is a block diagram showing the vehicle dispatch management device 1C according to the third reference embodiment. The vehicle dispatch management device 1C shown in FIG. 8 sets a waypoint destination at which the autonomous driving vehicle stops in order for the user to take a rest within the vehicle based on a next morning destination of the user after the option indicating that the purpose of use of the autonomous driving vehicle is to take a rest within the vehicle is selected by the user and the second information is presented to the user. The "next morning destination" is a destination (final destination) of the user next morning after the user takes a rest within the vehicle. The "waypoint destination" is a point at which the autonomous driving vehicle stops in order for the user to take a rest within the vehicle while the autonomous driving vehicle travels toward the next morning destination from the dispatched point. For example, the waypoint destination may be an affiliated parking lot (a parking lot in a shopping mall) registered in advance. Hereinafter, the "destination" of the autonomous driving vehicle includes both the next morning destination and the waypoint destination of the autonomous driving vehicle.

The vehicle dispatch management device 1C includes an option presentation unit 10C, an option reception unit 11C, a feature information presentation unit 12C, a vehicle dispatch unit 17C, and a destination setting unit 18C. The option presentation unit 10C has the same function as that of the option presentation unit 10. The option reception unit 11C has the same function as that of the option reception unit 11. The feature information presentation unit 12C has the same function as that of the feature information presentation unit 12.

The vehicle dispatch unit 17C dispatches the autonomous driving vehicle by using the vehicle management system 3 according to the vehicle dispatch request from the user. More specifically, when the vehicle dispatch request is received from the user through the user terminal 2, the vehicle dispatch unit 17C transmits a vehicle dispatch instruction corresponding to the vehicle dispatch request to the autonomous driving vehicle from the vehicle management system 3, and dispatches the autonomous driving vehicle by using the vehicle management system 3. For example, the "vehicle dispatch instruction" includes information for specifying the autonomous driving vehicle to be dispatched, the purpose of use of the autonomous driving vehicle, and the next morning destination of the user.

The vehicle dispatch unit 17C checks that the user rides the autonomous driving vehicle after the autonomous driving vehicle is dispatched by the vehicle management system 3. The vehicle dispatch unit 17C may check that the user rides the autonomous driving vehicle by using any means. For example, the vehicle dispatch unit 17C may check that the user rides the autonomous driving vehicle by receiving information indicating that the dispatched autonomous driving vehicle detects the riding of the user from the autonomous driving vehicle in a direct manner or through the vehicle management system 3.

The destination setting unit 18C sets the destination of the autonomous driving vehicle to be dispatched (or that is dispatched). The destination setting unit 18C may automatically set the destination of the autonomous driving vehicle to be dispatched (or that is dispatched) in any of candidates of the destination registered in advance (affiliated parking lot) or may set the destination of the autonomous driving vehicle to be dispatched in a destination designated by the user.

When the destination of the autonomous driving vehicle is set in the destination designated by the user, the destination setting unit 18C performs the following process. That is, the destination setting unit 18C transmits the information regarding the input screen of the destination of the movement using the autonomous driving vehicle to be dispatched (or that is dispatched) to the user terminal 2, and outputs (displays) the input screen through the output device. The aspect of the input screen is not particularly limited. For example, the input screen may be displayed as an aspect in which the destination is represented as an option, an aspect in which the destination is input as characters, or an aspect in which the destination is designated on a map.

The destination setting unit 18C receives the destination input by the user. More specifically, the destination setting unit 18C receives the destination input by the user by transmitting information regarding the destination input by the user on the input screen output (displayed) through the output device to the vehicle dispatch management device 1C from the user terminal 2. Through the aforementioned process, the destination setting unit 18C sets the destination of the autonomous driving vehicle to be dispatched (or that is dispatched) in the destination designated by the user.

Figure 9:
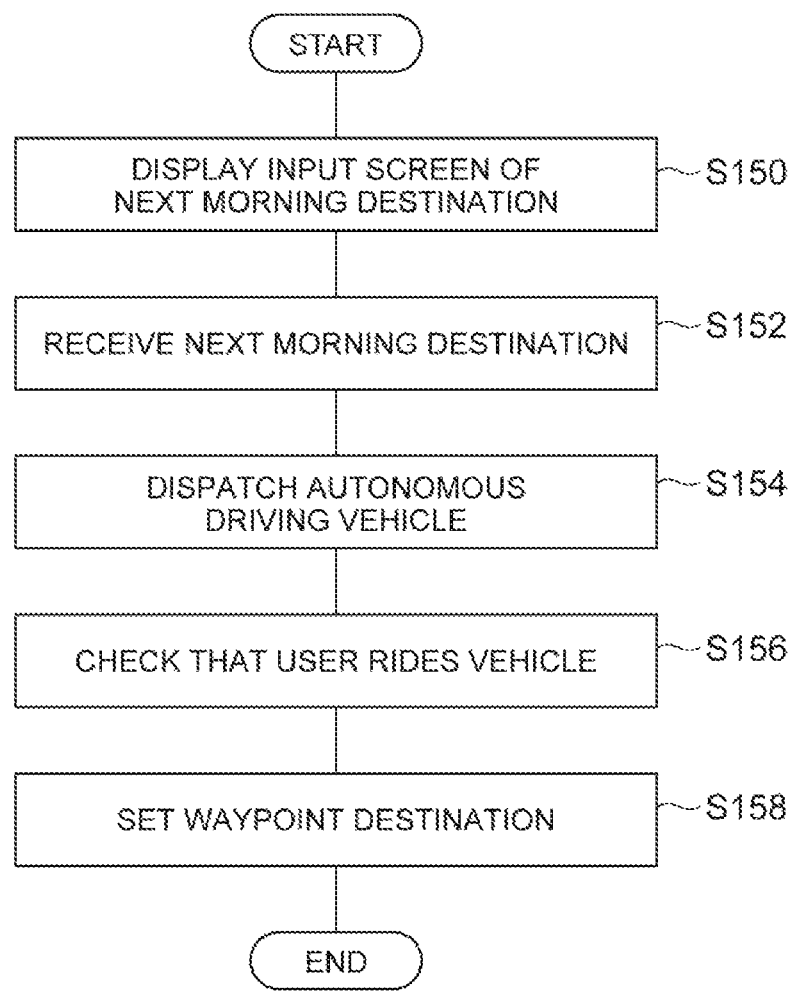
FIG. 9 is a flowchart showing a process performed by the vehicle dispatch management device according to the third reference embodiment.

Hereinafter, a process performed by the vehicle dispatch management device 1C will be described. FIG. 9 is a flowchart showing the process performed by the vehicle dispatch management device 1C according to the third reference embodiment. The flowchart of FIG. 9 is performed when an instruction to dispatch the autonomous driving vehicle as the dispatch vehicle candidate is received from the user through the user terminal 2 after step S18 in the flowchart of FIG. 3.

As shown in FIG. 9, in step S150, the destination setting unit 18C of the vehicle dispatch management device 1C transmits information regarding the input screen of the next morning destination of the autonomous driving vehicle to be dispatched to the user terminal 2, and outputs (displays) the input screen through the output device. Subsequently, the vehicle dispatch management device 1C proceeds to step S152.

In step S152, the information regarding the next morning destination input by the user on the input screen output (displayed) through the output device is transmitted to the vehicle dispatch management device 1C from the user terminal 2, and thus, the destination setting unit 18C of the vehicle dispatch management device 1C receives the next morning destination input by the user. Thereafter, the vehicle dispatch management device 1C proceeds to step S154.

In step S154, the vehicle dispatch unit 17C of the vehicle dispatch management device 1C dispatches the autonomous driving vehicle by using the vehicle management system 3 by transmitting the vehicle dispatch instruction to the autonomous driving vehicle from the vehicle management system 3. Accordingly, the autonomous driving vehicle that receives the vehicle dispatch instruction travels to the vehicle dispatch point through the autonomous driving. Thereafter, the vehicle dispatch management device 1C proceeds to step S156.

In step S156, the vehicle dispatch unit 17C of the vehicle dispatch management device 1C checks that the user rides the autonomous driving vehicle. Subsequently, the vehicle dispatch management device 1C proceeds to step S158.

In step S158, the destination setting unit 18C of the vehicle dispatch management device 1C automatically sets the waypoint destination of the dispatched autonomous driving vehicle in any of candidates of the destination (affiliated parking lot) registered in advance. When the waypoint destination of the dispatched autonomous driving vehicle is set, the vehicle dispatch management device 1C ends the process of this flowchart. The dispatched autonomous driving vehicle starts to travel toward the waypoint destination through the autonomous driving.

As described above, in accordance with the vehicle dispatch management device 1C according to the third reference embodiment, the waypoint destination at which the autonomous driving vehicle stops in order for the user to take a rest within the vehicle is set based on the next morning destination of the user. The autonomous driving vehicle automatically drives toward the next morning destination next morning after the user takes a rest within the vehicle at the waypoint destination. Thus, in the vehicle dispatch management device 1C, the autonomous driving vehicle can stop in a place suitable to take a rest within the vehicle. In the vehicle dispatch management device 1C, when the next morning destination is opposite to the home from the vehicle dispatch point, it is possible to restrain a movement time of the user from being long compared to a case where the user moves to the next morning destination after the user goes home once.

In step S158, the destination setting unit 18C of the vehicle dispatch management device 1C may inquire of the user and may set the point designated by the user in the waypoint destination of the autonomous driving vehicle without automatically setting the waypoint destination of the dispatched autonomous driving vehicle.

Fourth Reference Embodiment

Figure 10:
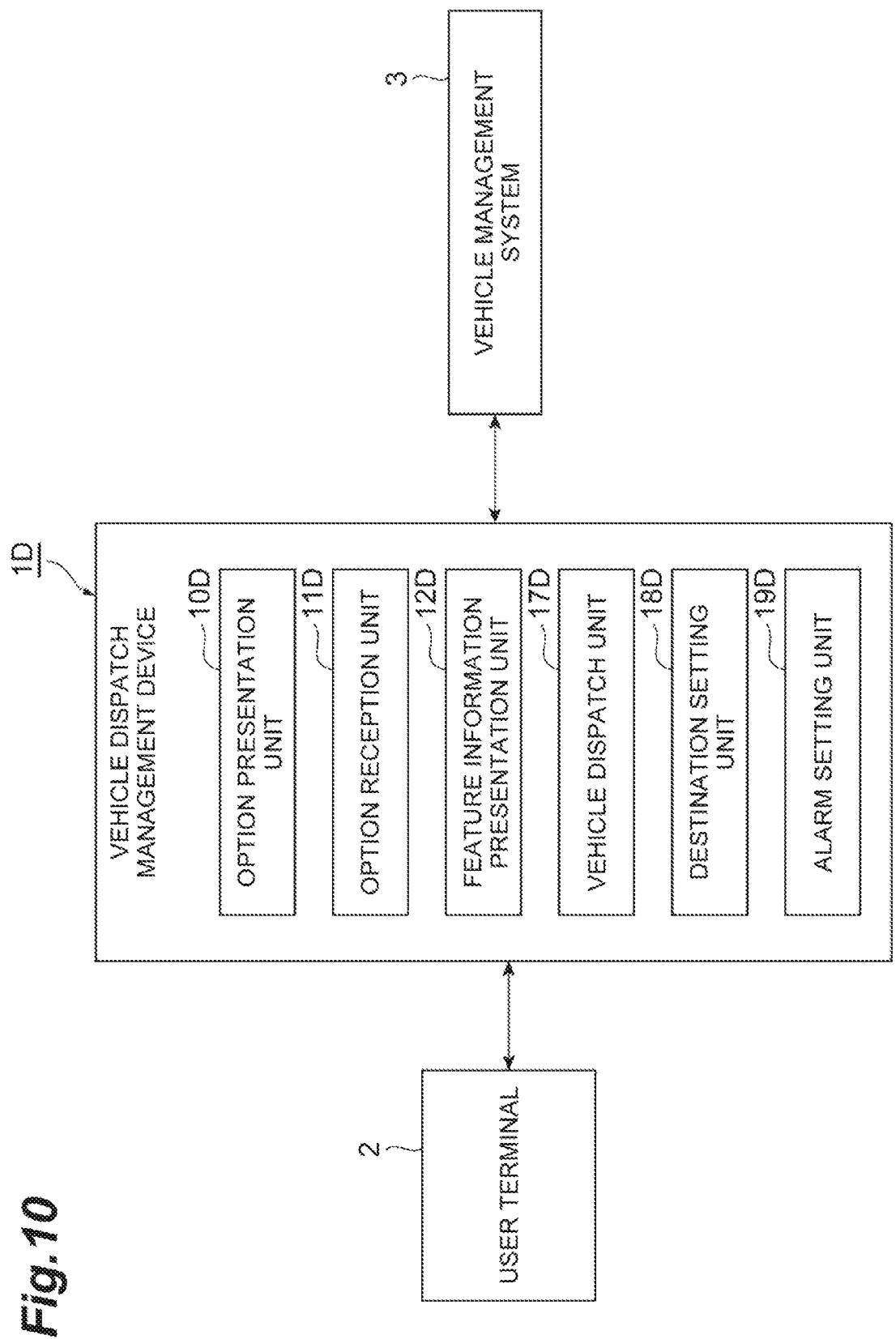
FIG. 10 is a block diagram showing a vehicle dispatch management device according to a fourth reference embodiment.

A vehicle dispatch management device 1D according to a fourth reference embodiment will be described. FIG. 10 is a block diagram showing the vehicle dispatch management device 1D according to the fourth reference embodiment. The vehicle dispatch management device 1D shown in FIG. 10 can allow the user to sleep soon by prompting the setting of an alarm timing when the user desires to go to bed soon after the user rides the dispatched autonomous driving vehicle.

The vehicle dispatch management device 1D includes an option presentation unit 10D, an option reception unit 11D, a feature information presentation unit 12D, a vehicle dispatch unit 17D, a destination setting unit 18D, and an alarm setting unit 19D. The feature information presentation unit 12D has the same function as that of the feature information presentation unit 12C. The vehicle dispatch unit 17D has the same function as that of the vehicle dispatch unit 17C.

The option presentation unit 10D has the following function in addition to the same function as that of the option presentation unit 10C. That is, the option presentation unit 10D presents an option of whether or not the user desires to sleep soon to the user who rides the dispatched autonomous driving vehicle. More specifically, when the user rides the dispatched autonomous driving vehicle, the option presentation unit 10D transmits information regarding the option of whether or not the user desires to sleep soon to the user terminal 2, and outputs the content of the option through the output device.

The option reception unit 11D has the following function in addition to the same function as that of the option reception unit 11C. That is, any option of whether or not the user desires to sleep soon which is output through the output device is selected by the user, and the option reception unit 11D transmits information regarding the selected option to the vehicle dispatch management device 1D from the user terminal 2. Thus, the option reception unit 11D receives the option selected by the user.

The destination setting unit 18D has the following function in addition to the same function as that of the destination setting unit 18C. That is, the destination setting unit 18D creates a traveling plan of the dispatched autonomous driving vehicle depending on the traveling environment and the alarm timing to be described below. The "traveling plan" is a plan on which the user stops to take a rest within the vehicle at the waypoint destination and moves to the next morning destination after the user takes a rest within the vehicle. On the traveling plan, the user may stop taking a rest within the vehicle in the set alarm timing.

The alarm setting unit 19D sets an alarm in a timing desired to wake up by the user in taking a rest within the vehicle. For example, the "alarm" may be sound output from a speaker of the autonomous driving vehicle. The alarm setting unit 19D transmits information regarding the input screen of the alarm timing to the user terminal 2, and outputs (displays) the input screen through the output device. The information regarding the alarm timing input by the user on the input screen output (displayed) through the output device is transmitted to the vehicle dispatch management device 1D from the user terminal 2, and thus, the alarm setting unit 19D receives the alarm timing input by the user. Accordingly, the alarm setting unit 19D sets the alarm in the alarm timing desired by the user.

Figure 11:
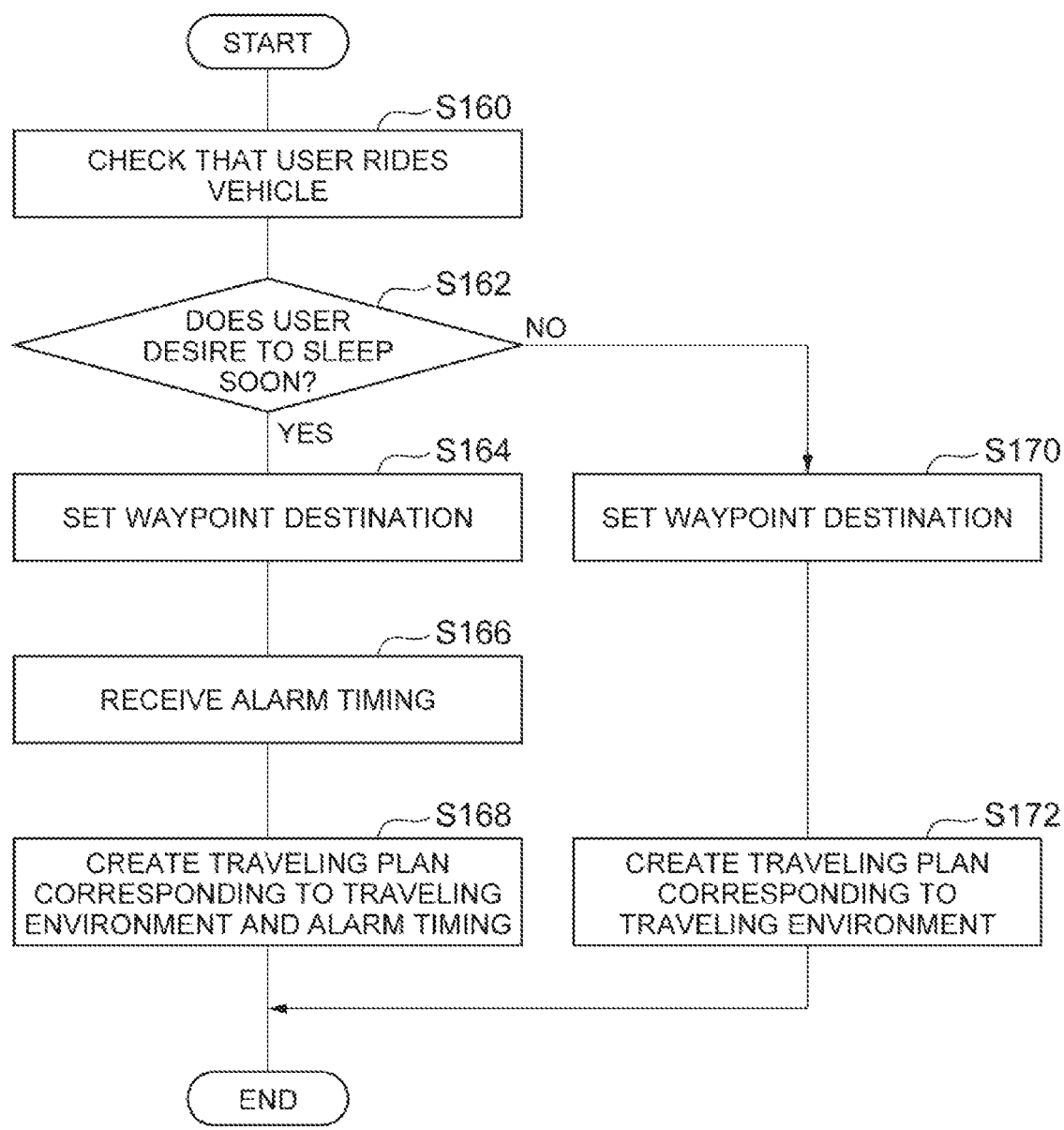
FIG. 11 is a flowchart showing a process performed by the vehicle dispatch management device according to the fourth reference embodiment.

Hereinafter, a process performed by the vehicle dispatch management device 1D will be described. FIG. 11 is a flowchart showing the process performed by the vehicle dispatch management device 1D according to the fourth reference embodiment. The flowchart of FIG. 11 is performed subsequently to step S154 in the flowchart of FIG. 9.

As shown in FIG. 11, in step S160, the vehicle dispatch unit 17D of the vehicle dispatch management device 1D checks that the user rides the dispatched autonomous driving vehicle. The autonomous driving vehicle starts to travel through the autonomous driving. At this time, the autonomous driving vehicle may travel toward the next morning destination through the autonomous driving or may travel (travel along a road) through the autonomous driving without setting a specific destination. Thereafter, the vehicle dispatch management device 1D proceeds to step S162.

In step S162, the option presentation unit 10D of the vehicle dispatch management device 1D presents the option of whether or not the user desires to sleep soon to the user who rides the dispatched autonomous driving vehicle. More specifically, the option presentation unit 10D transmits the information regarding the option of whether or not the user desires to sleep soon to the user terminal 2, and outputs the content of the option through the output device. Thereafter, when any option of whether or not the user desires to sleep soon which is output through the output device is selected by the user, the information regarding the selected option is transmitted to the vehicle dispatch management device 1D from the user terminal 2. Accordingly, the option reception unit 11D of the vehicle dispatch management device 1D receives the option of whether or not the user desires to sleep soon which is selected by the user. When the option selected by the user is the option indicating that the user desires to sleep soon (step S162: YES), the vehicle dispatch management device 1D proceeds to step S164. Meanwhile, when the option selected by the user is not the option indicating that the user desires to sleep soon (step S162: NO), the vehicle dispatch management device 1D proceeds to step S170.

In step S164, the destination setting unit 18D of the vehicle dispatch management device 1D automatically sets the waypoint destination of the autonomous driving vehicle in any of candidates of the destination (affiliated parking lot) registered in advance. The autonomous driving vehicle sets the destination of the autonomous driving in the waypoint destination, and travels toward the waypoint destination through the autonomous driving. Thereafter, the vehicle dispatch management device 1D proceeds to step S166.

In step S166, the alarm setting unit 19D of the vehicle dispatch management device 1D transmits the information regarding the input screen of the alarm timing to the user terminal 2, and outputs (displays) the input screen through the output device. Thereafter, the information regarding the alarm timing input by the user on the input screen output (displayed) through the output device is transmitted to the vehicle dispatch management device 1D from the user terminal 2. Accordingly, the alarm setting unit 19D receives the alarm timing input by the user. The alarm setting unit 19D sets the alarm in the received alarm timing. Thereafter, the vehicle dispatch management device 1D proceeds to step S168.

In step S168, the destination setting unit 18D of the vehicle dispatch management device 1D creates a traveling plan of the autonomous driving vehicle depending on the traveling environment and the alarm timing of the alarm set by the alarm setting unit 19D. When the traveling plan of the autonomous driving vehicle is created, the vehicle dispatch management device 1D ends the process of this flowchart. The autonomous driving vehicle sets the destination of the autonomous driving in the waypoint destination, and starts to travel toward the waypoint destination through the autonomous driving.

In step S170, the destination setting unit 18D of the vehicle dispatch management device 1D automatically sets the waypoint destination of the autonomous driving vehicle in any of candidates of the destination (affiliated parking lot) registered in advance. Alternatively, the destination setting unit 18D inquires of the user and sets the point designated by the user as the waypoint destination of the autonomous driving vehicle without automatically setting the waypoint destination of the autonomous driving vehicle. The autonomous driving vehicle sets the destination of the autonomous driving in the waypoint destination, and travels toward the waypoint destination through the autonomous driving. Subsequently, the vehicle dispatch management device 1D proceeds to step S172.

In step S172, the destination setting unit 18D of the vehicle dispatch management device 1D creates a traveling plan of the autonomous driving vehicle depending on the traveling environment. When the traveling plan of the autonomous driving vehicle is created, the vehicle dispatch management device 1D ends the process of this flowchart. The autonomous driving vehicle sets the destination of the autonomous driving in the waypoint destination, and starts to travel toward the waypoint destination through the autonomous driving.

As described above, in accordance with the vehicle dispatch management device 1D according to the fourth reference embodiment, when the user desires to sleep soon after the user rides the dispatched autonomous driving vehicle, the user can sleep soon by prompting the setting of the alarm timing.

Fifth Reference Embodiment

Figure 12:
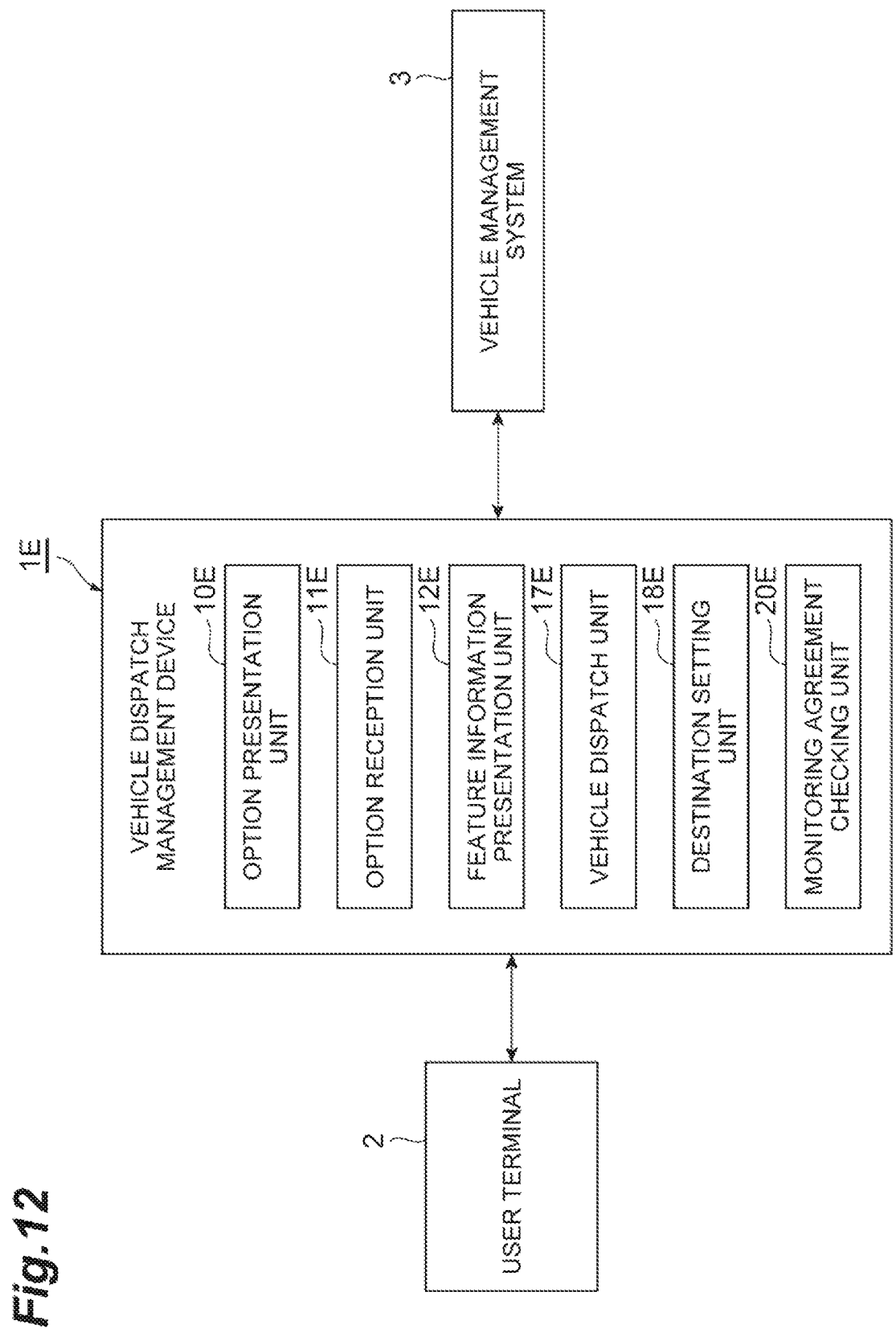
FIG. 12 is a block diagram showing a vehicle dispatch management device according to a fifth reference embodiment.

A vehicle dispatch management device 1E according to a fifth reference embodiment will be described. FIG. 12 is a block diagram showing the vehicle dispatch management device 1E according to the fifth reference embodiment. The vehicle dispatch management device 1E shown in FIG. 12 checks whether or not the user agrees that the inside of the autonomous driving vehicle dispatched in order to take a rest within the vehicle is monitored. The "monitoring" is to check that the user has not done a prohibit behavior within the autonomous driving vehicle while the user takes a rest within the vehicle. More specifically, the monitoring may be performed by imaging images before and after the user takes a rest within the vehicle by using an imaging device such as a camera, may be performed by imaging the inside of the vehicle while the user takes a rest within the vehicle by using the imaging device such as the camera, or may be performed by collecting voice within the vehicle while the user takes a rest by using a sound collection device such as a microphone.

The vehicle dispatch management device 1E includes an option presentation unit 10E, an option reception unit 11E, a feature information presentation unit 12E, a vehicle dispatch unit 17E, a destination setting unit 18E, and a monitoring agreement checking unit 20E. The option presentation unit 10E has the same function as the option presentation unit 10C. The option reception unit 11E has the same function as the option reception unit 11C. The feature information presentation unit 12E has the same function as that of the feature information presentation unit 12C. The vehicle dispatch unit 17E has the same function as that of the vehicle dispatch unit 17C. The destination setting unit 18E has the same function as that of the destination setting unit 18C.

The monitoring agreement checking unit 20E presents an option of whether or not the user agrees that the inside of the autonomous driving vehicle is monitored while the user takes a rest within the vehicle to the user who requests the dispatch of the autonomous driving vehicle in order to take a rest within the vehicle. More specifically, the monitoring agreement checking unit 20E transmits information regarding the option of whether or not the user agrees that the inside of the autonomous driving vehicle is monitored while the user takes a rest within the vehicle to the user terminal 2, and outputs the content of the option through the output device.

The monitoring agreement checking unit 20E receives the option selected by the user about the option of whether or not the user agrees that the inside of the autonomous driving vehicle is monitored while the user takes a rest within the vehicle. More specifically, any option output through the output device is selected by the user, and information regarding the selected option is transmitted to the vehicle dispatch management device 1E from the user terminal 2. Thus, the option reception unit 11 receives the option selected by the user.

When the option selected by the user is received, the monitoring agreement checking unit 20E determines whether or not the option is an option indicating that the user agrees that the inside of the autonomous driving vehicle is monitored while the user takes a rest within the vehicle.

Hereinafter, a process performed by the vehicle dispatch management device 1E will be described. The vehicle dispatch management device 1E performs any of a monitoring agreement checking process after the vehicle dispatch and a monitoring agreement checking process before the vehicle dispatch.

Figure 13:
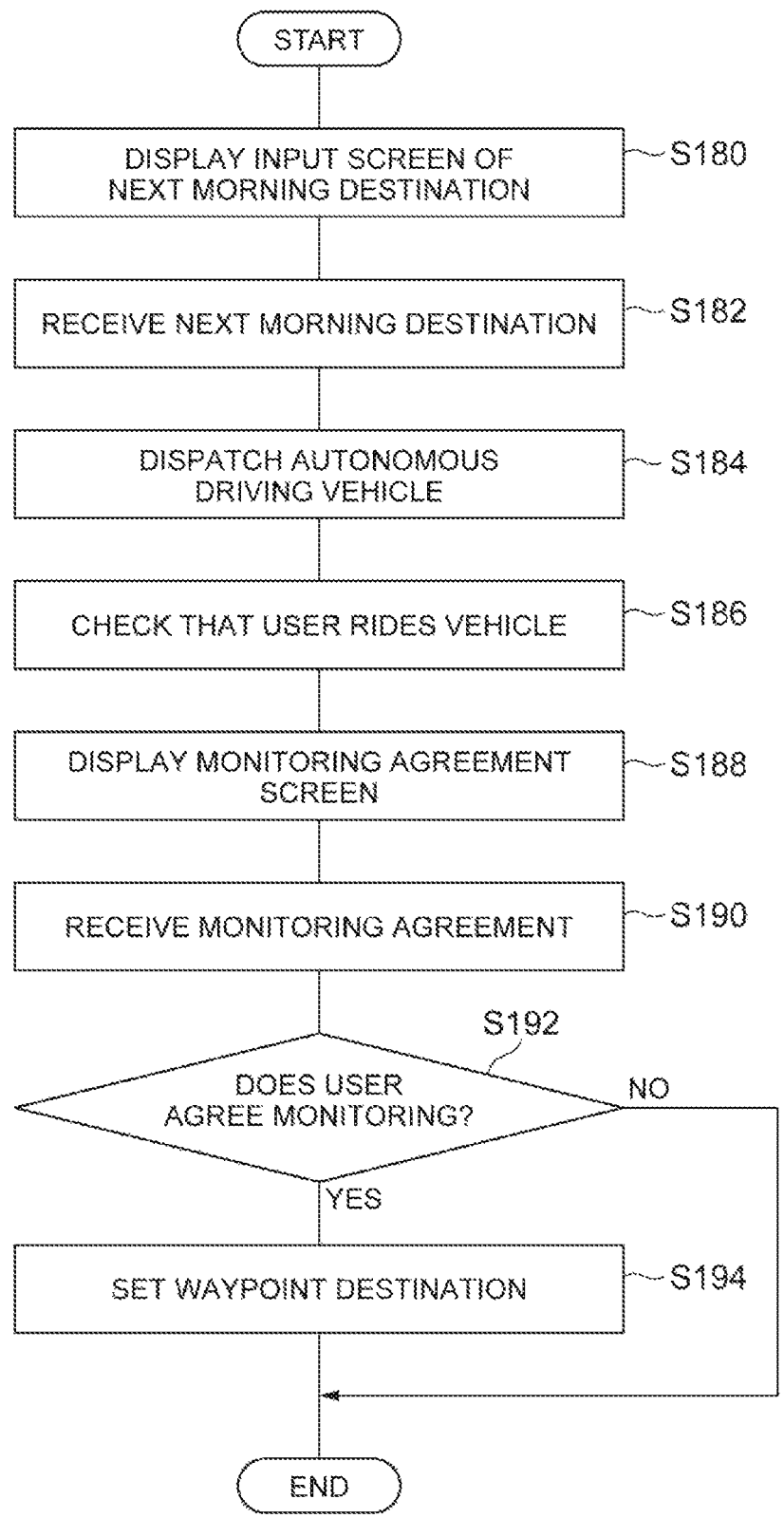
FIG. 13 is a flowchart showing a process performed after the vehicle dispatch by the vehicle dispatch management device according to the fifth reference embodiment.

Initially, the process performed after the vehicle dispatch by the vehicle dispatch management device 1E will be described. FIG. 13 is a flowchart showing the process performed after the vehicle dispatch by the vehicle dispatch management device 1E according to the fifth reference embodiment. The flowchart of FIG. 13 is performed when an instruction to dispatch the autonomous driving vehicle as the dispatch vehicle candidate is received from the user through the user terminal 2 after step S18 in the flowchart of FIG. 3.

As shown in FIG. 13, in steps S180 to S186, the vehicle dispatch management device 1E performs the same processes as those of steps S150 to S156 in the flowchart of FIG. 9 of the vehicle dispatch management device 1C according to the third reference embodiment. That is, the vehicle dispatch management device 1E performs the same process as that of step S150 in step S180, performs the same process as that of step S152 in step S182, performs the same process as that of step S154 in step S184, and performs the same process as that of step S156 in step S186. Subsequently, the vehicle dispatch management device 1E proceeds to step S188.

In step S188, the monitoring agreement checking unit 20E of the vehicle dispatch management device 1E presents the option of whether or not the user agrees that the inside of the autonomous driving vehicle is monitored while the user takes a rest within the vehicle to the user who requests the dispatch of the autonomous driving vehicle in order to take a rest within the vehicle. Thereafter, the vehicle dispatch management device 1E proceeds to step S190.

In step S190, the monitoring agreement checking unit 20E of the vehicle dispatch management device 1E receives the option selected by the user about the option of whether or not the user agrees that the inside of the autonomous driving vehicle is monitored while the user takes a rest within the vehicle. Subsequently, the vehicle dispatch management device 1E proceeds to step S192.

In step S192, the monitoring agreement checking unit 20E of the vehicle dispatch management device 1E determines whether or not the option selected by the user is the option indicating that the user agrees that the inside of the autonomous driving vehicle is monitored while the user takes a rest within the vehicle. When the monitoring agreement checking unit determines that the selected option is the option indicating that the user agrees that the inside of the autonomous driving vehicle is monitored while the user takes a rest within the vehicle (step S192: YES), the vehicle dispatch management device 1E proceeds to step S194. Meanwhile, when the monitoring agreement checking unit determines that the selected option is not the option indicating that the user agrees that the inside of the autonomous driving vehicle is monitored while the user takes a rest within the vehicle (step S192: NO), the vehicle dispatch management device 1E ends the process of this flowchart. When the monitoring agreement checking unit determines that the option selected by the user is not the option indicating that the user agrees that the inside of the autonomous driving vehicle is monitored while the user takes a rest within the vehicle, the vehicle dispatch management device 1E may notify the user that the user cannot take a rest within the vehicle in the autonomous driving vehicle.

In step S194, the vehicle dispatch management device 1E performs the same process as that of step S158 in the flowchart of FIG. 9 of the vehicle dispatch management device 1C according to the third reference embodiment. When the process of step S194 is performed, the vehicle dispatch management device 1E ends the process of this flowchart.

Figure 14:
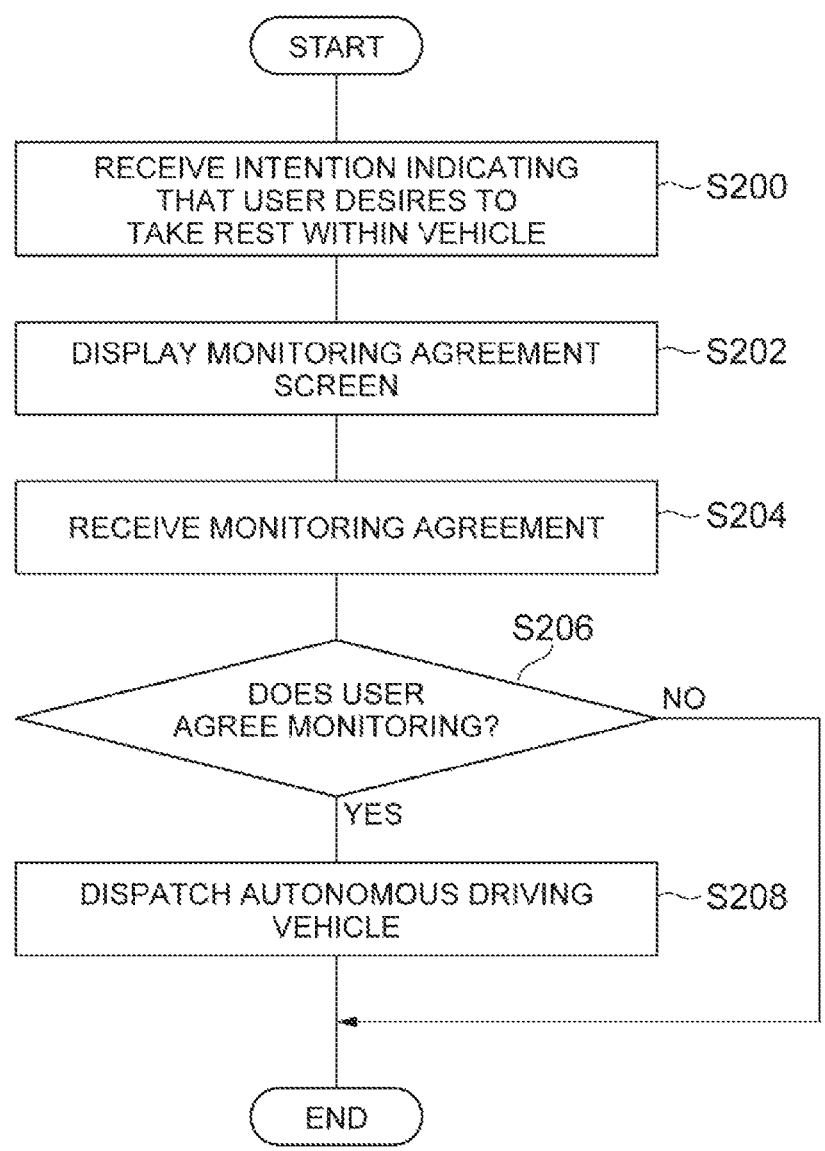
FIG. 14 is a flowchart showing a process performed before the vehicle dispatch by the vehicle dispatch management device according to the fifth reference embodiment.

Hereinafter, a process performed before the vehicle dispatch by the vehicle dispatch management device 1E will be described. FIG. 14 is a flowchart showing the process performed before the vehicle dispatch by the vehicle dispatch management device 1E according to the fifth reference embodiment. The flowchart of FIG. 14 is performed subsequently to step s 10 in the flowchart of FIG. 3.

In step S200, any option output through the output device about the determination of whether or not the purpose of use of the autonomous driving vehicle is to take a rest within the vehicle is selected by the user, and information regarding the selected option is transmitted to the vehicle dispatch management device 1E from the user terminal 2. Thus, the option reception unit 11E of the vehicle dispatch management device 1E receives the option selected by the user. Here, the option reception unit 11E receives an option indicating that the purpose of use of the autonomous driving vehicle is to take a rest within the vehicle as the option selected by the user. In other words, the option reception unit 1 receives an intention of the user who desires to take a rest within the vehicle. Thereafter, the vehicle dispatch management device 1E proceeds to step S202.

In step S202, the monitoring agreement checking unit 20E of the vehicle dispatch management device 1E presents the option of whether or not the user agrees that the inside of the autonomous driving vehicle is monitored while the user takes a rest within the vehicle to the user who requests the dispatch of the autonomous driving vehicle in order to take a rest within the vehicle. Thereafter, the vehicle dispatch management device 1E proceeds to step S204.

In step S204, the monitoring agreement checking unit 20E of the vehicle dispatch management device 1E receives the option selected by the user about the option of whether or not the user agrees that the inside of the autonomous driving vehicle is monitored while the user takes a rest within the vehicle. Thereafter, the vehicle dispatch management device 1E proceeds to step S206.

In step S206, the monitoring agreement checking unit 20E of the vehicle dispatch management device 1E determines whether or not the option selected by the user is the option indicating that the user agrees that the inside of the autonomous driving vehicle is monitored while the user takes a rest within the vehicle. When the monitoring agreement checking unit determines that the option selected by the user is the option indicating that the user agrees that the inside of the autonomous driving vehicle is monitored while the user takes a rest within the vehicle (step S206: YES), the vehicle dispatch management device 1E proceeds to step S208. Meanwhile, when the monitoring agreement checking unit determines that the option selected by the user is not the option indicating that the user agrees that the inside of the autonomous driving vehicle is monitored while the user takes a rest within the vehicle (step S206: NO), the vehicle dispatch management device 1E ends the process of this flowchart. When the monitoring agreement checking unit determines that the option selected by the user is not the option indicating that the user agrees that the inside of the autonomous driving vehicle is monitored while the user takes a rest within the vehicle, the vehicle dispatch management device 1E may notify the user that the dispatch of the autonomous driving vehicle in order to take a rest within the vehicle is unavailable.

In step S208, the vehicle dispatch unit 17E of the vehicle dispatch management device 1E transmits the vehicle dispatch instruction to the autonomous driving vehicle from the vehicle management system 3, and dispatches the autonomous driving vehicle by using the vehicle management system 3. Accordingly, the autonomous driving vehicle that receives the vehicle dispatch instruction travels to the vehicle dispatch point through the autonomous driving. When the autonomous driving vehicle is dispatched, the vehicle dispatch management device 1E ends the process of this flowchart.

As described above, in accordance with the vehicle dispatch management device 1E according to the fifth reference embodiment, since the user can check whether or not the user agrees that the inside of the autonomous driving vehicle dispatched in order to take a rest within the vehicle is monitored, it is possible to restrain the user from doing the prohibit behavior within the autonomous driving vehicle.

Sixth Reference Embodiment

Figure 15:
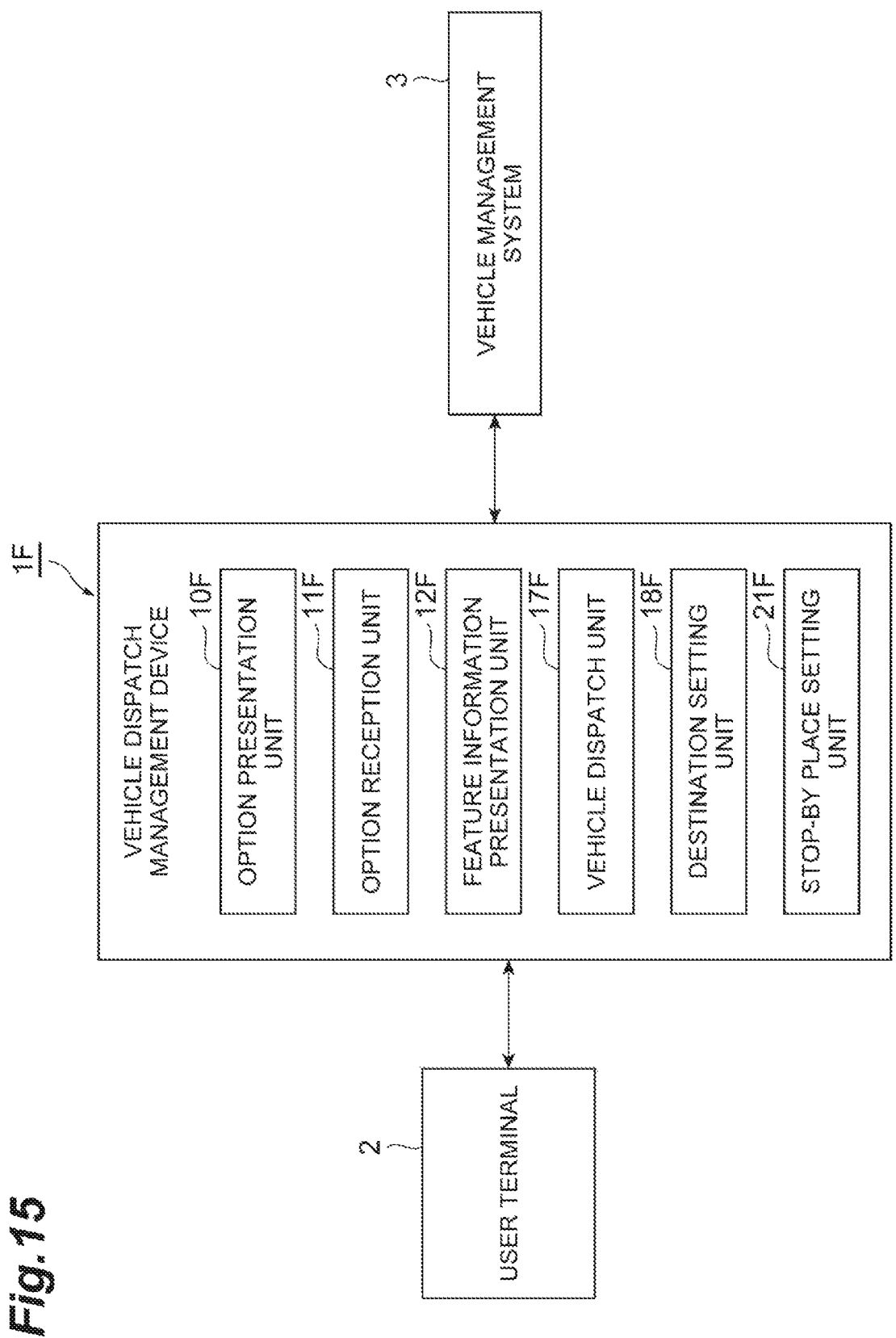
FIG. 15 is a block diagram showing a vehicle dispatch management device according to a sixth reference embodiment.

A vehicle dispatch management device 1F according to a sixth reference embodiment will be described. FIG. 15 is a block diagram showing the vehicle dispatch management device 1F according to the sixth reference embodiment. When the autonomous driving vehicle is dispatched in order to take a rest within the vehicle and the user desires to stop by a stop-by place in order to prepare to take a rest within the vehicle before the user takes a rest within the vehicle, the vehicle dispatch management device 1F shown in FIG. 15 sets the stop-by place in the destination. The "stop-by place" is a place where the user stops by in order to prepare to take a rest within the vehicle. For example, the stop-by place is a convenience store or a public bath.

The vehicle dispatch management device 1F includes an option presentation unit 10F, an option reception unit 11F, a feature information presentation unit 12F, a vehicle dispatch unit 17F, a destination setting unit 18F, and a stop-by place setting unit 21F. The option presentation unit 10F has the same function as that of the option presentation unit 10C. The option reception unit 11F has the same function as that of the option reception unit 11C. The feature information presentation unit 12F has the same function as that of the feature information presentation unit 12C. The vehicle dispatch unit 17F has the same function as that of the vehicle dispatch unit 17C.

The stop-by place setting unit 21F presents an option of whether or not the user desires to stop by the stop-by place in order to prepare to take a rest within the vehicle to the user who rides the dispatched autonomous driving vehicle. More specifically, when the user rides the dispatched autonomous driving vehicle, the stop-by place setting unit 21F transmits information regarding the option of whether or not the user desires to stop by the stop-by place in order to prepare to take a rest within the vehicle to the user terminal 2, and outputs the content of the option through the output device.

Any option of whether or not the user desires to stop by the stop-by place which is output through the output device is selected by the user, and information regarding the selected option is transmitted to the vehicle dispatch management device 1F from the user terminal 2. Thus, the option reception unit 11F receives the option selected by the user.

The stop-by place setting unit 21F determines whether or not the option selected by the user is an option indicating that the user desires to stop by the stop-by place in order to prepare to take a rest within the vehicle.

When the user desires to stop by the stop-by place in order to prepare to take a rest within the vehicle, the destination setting unit 18F creates a traveling plan of the autonomous driving vehicle that moves a place where the user takes a rest within the vehicle after the user stops by the stop-by place.

Figure 16:
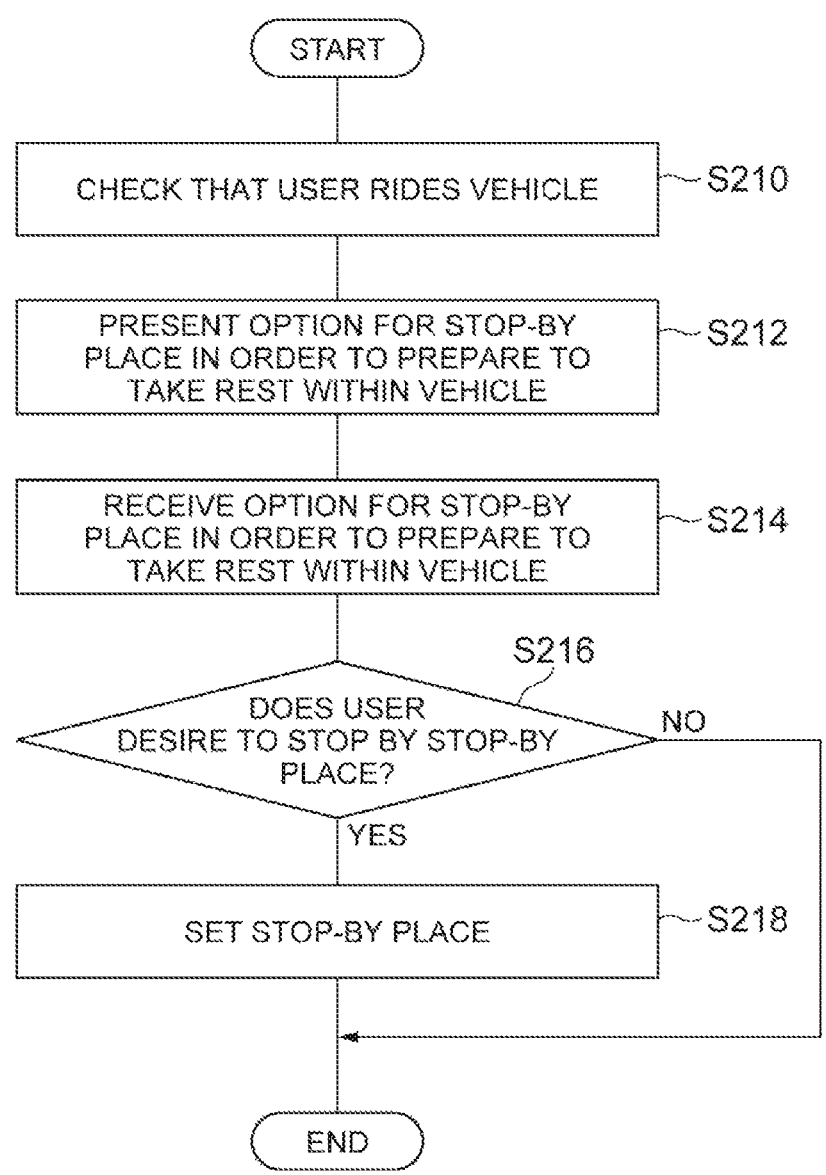
FIG. 16 is a flowchart showing a process performed by the vehicle dispatch management device according to the sixth reference embodiment.

Hereinafter, a process performed by the vehicle dispatch management device 1F will be described. FIG. 16 is a flowchart showing the process performed by the vehicle dispatch management device 1F according to the sixth reference embodiment. The flowchart of FIG. 16 is performed subsequently to step S154 in the flowchart of FIG. 9.

As shown in FIG. 16, in step S210, the vehicle dispatch unit 17F of the vehicle dispatch management device 1F checks that the user rides the dispatched autonomous driving vehicle. The autonomous driving vehicle starts to travel through the autonomous driving. At this time, the autonomous driving vehicle travels toward the place where the user takes a rest within the vehicle through the autonomous driving. Thereafter, the vehicle dispatch management device 1F proceeds to step S212.

In step S212, the stop-by place setting unit 21F of the vehicle dispatch management device 1F presents the option of whether or not the user desires to stop by the stop-by place in order to prepare to take a rest within the vehicle to the user who rides the dispatched autonomous driving vehicle. More specifically, when the user rides the dispatched autonomous driving vehicle, the stop-by place setting unit 21F transmits information regarding the option of whether or not the user desires to stop by the stop-by place in order to prepare to take a rest within the vehicle to the user terminal 2, and outputs the content of the option through the output device. Subsequently, the vehicle dispatch management device 1F proceeds to step S214.

In step S214, any option of whether or not the user desires to stop by the stop-by place which is output through the output device is selected by the user, and information regarding the selected option is transmitted to the vehicle dispatch management device 1F form the user terminal 2. Thus, the option reception unit 11F of the vehicle dispatch management device 1F receives the option selected by the user. Thereafter, the vehicle dispatch management device 1F proceeds to step S216.

In step S216, the stop-by place setting unit 21F of the vehicle dispatch management device 1F determines whether or not the option selected by the user is the option indicating that the user desires to stop by the stop-by place in order to prepare to take a rest within the vehicle. When the stop-by place setting unit determines that the option selected by the user is the option indicating that the user desires to stop by the stop-by place in order to prepare to take a rest within the vehicle (step S216: YES), the vehicle dispatch management device 1F proceeds to step S218. Meanwhile, when the stop-by place setting unit does not determine that the option selected by the user is the option indicating that the user desires to stop by the stop-by place in order to prepare to take a rest within the vehicle (step S216: NO), the vehicle dispatch management device 1F ends the process of this flowchart without setting the stop-by place in the destination.

In step S218, the destination setting unit 18F of the vehicle dispatch management device 1F creates a traveling plan of the autonomous driving vehicle that moves to the place where the user takes a rest within the vehicle after the user stops by the stop-by place set by the stop-by place setting unit 21F. When the traveling plan of the autonomous driving vehicle is created, the vehicle dispatch management device 1F ends the process of this flowchart. The autonomous driving vehicle sets the stop-by place in the destination of the autonomous driving, and starts to travel toward the stop-by place through the autonomous driving.

As described above, in accordance with the vehicle dispatch management device 1F according to the sixth reference embodiment, when the autonomous driving vehicle is dispatched in order to take a rest within the vehicle and the user desires to stop by the stop-by place in order to prepare to take a rest within the vehicle before the user takes a rest within the vehicle, it is possible to set the stop-by place in the destination.

Seventh Reference Embodiment

Figure 17:
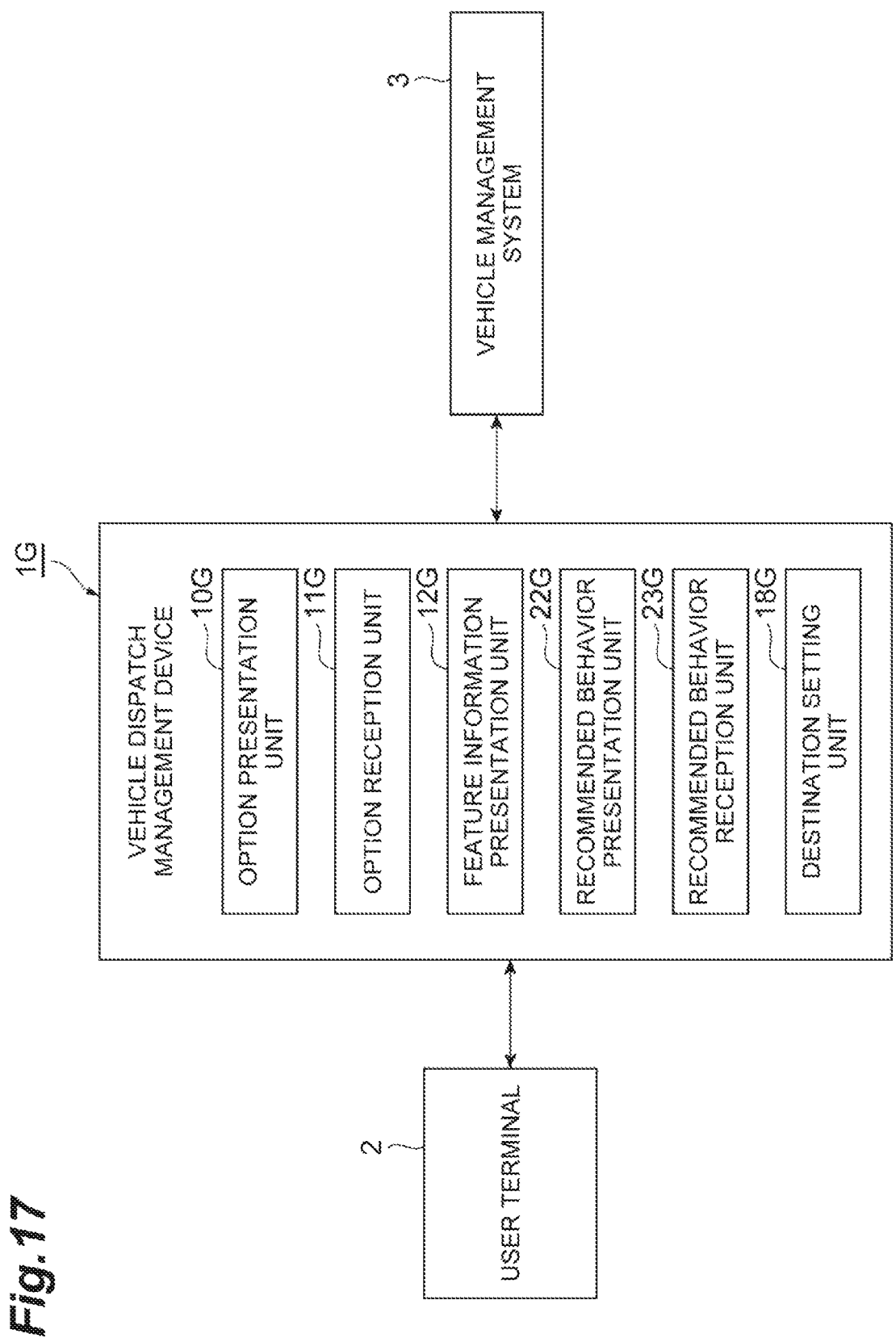
FIG. 17 is a block diagram showing a vehicle dispatch management device according to a seventh reference embodiment.

A vehicle dispatch management device 1G according to a seventh reference embodiment will be described. FIG. 17 is a block diagram showing the vehicle dispatch management device 1G according to the seventh reference embodiment. When the autonomous driving vehicle is dispatched in order to take a rest within the vehicle, the vehicle dispatch management device 1G shown in FIG. 17 presents a recommended behavior recommended to do before the autonomous driving vehicle is dispatched to the user. In this case, when there is a user desire regarding an execution timing of the recommended behavior, the vehicle dispatch management device 1G creates a traveling plan corresponding to the user desire. The "recommended behavior" is a behavior that is beneficial to the user by doing the behavior before the user takes a rest within the vehicle. For example, the recommended behavior refers to that the user purchases food and drink, goes to the restroom, brushes their teeth, and takes a bath.

The vehicle dispatch management device 1G includes an option presentation unit 10G an option reception unit 11G, feature information presentation unit 12G, a destination setting unit 18G, a recommended behavior presentation unit 22G, and a recommended behavior reception unit 23G. The option presentation unit 10G has the same function as that of the option presentation unit 10. The option reception unit 11G has the same function as that of the option reception unit 11. The feature information presentation unit 12G has the same function as that of the feature information presentation unit 12.

The recommended behavior presentation unit 22G notifies the user of a vehicle dispatch estimated timing and a vehicle dispatch position of the autonomous driving vehicle in order to take a rest within the vehicle. For example, the recommended behavior presentation unit 22G may obtain information regarding the vehicle dispatch estimated timing and the vehicle dispatch position of the autonomous driving vehicle from the vehicle management system 3, and may output (display) the information through the display device of the user terminal 2.

When the autonomous driving vehicle is dispatched in order to take a rest within the vehicle, the recommended behavior presentation unit 22G presents the recommended behavior recommended to do before the autonomous driving vehicle is dispatched to the user. More specifically, the recommended behavior presentation unit 22G transmits information regarding the recommended behavior to the user terminal 2 and outputs the content of the recommended behavior through the output device before the autonomous driving vehicle is dispatched in order to take a rest within the vehicle. The presented recommended behavior may be determined based on the vehicle dispatch estimated timing and the vehicle dispatch position of the autonomous driving vehicle.

The recommended behavior presentation unit 22G presents an input screen of the execution timing of the recommended behavior desired by the user to the user about the recommended behavior presented to the user. More specifically, the recommended behavior presentation unit 22G transmits information regarding the input screen of the execution timing of the recommended behavior desired by the user to the user terminal 2, and outputs (displays) the input screen through the output device.

The information regarding the execution timing of the recommended behavior input by the user on the input screen output (displayed) through the output device is transmitted to the vehicle dispatch management device 1G from the user terminal 2, and thus, the recommended behavior reception unit 23G receives the execution timing of the recommended behavior input the user. The recommended behavior reception unit 23G determines whether or not there is the user desire regarding the execution timing of the recommended behavior based on the received information regarding the execution timing.

The destination setting unit 18G creates a traveling plan based on the execution timing of the recommended behavior input by the user. As an example, when there is the user desire to take a bath after the user takes a rest within the vehicle (next morning), the destination setting unit 18G may give the user an opportunity to take a bath by adding the public bath to the traveling plan after the user takes a rest within the vehicle (next morning).

Figure 18:
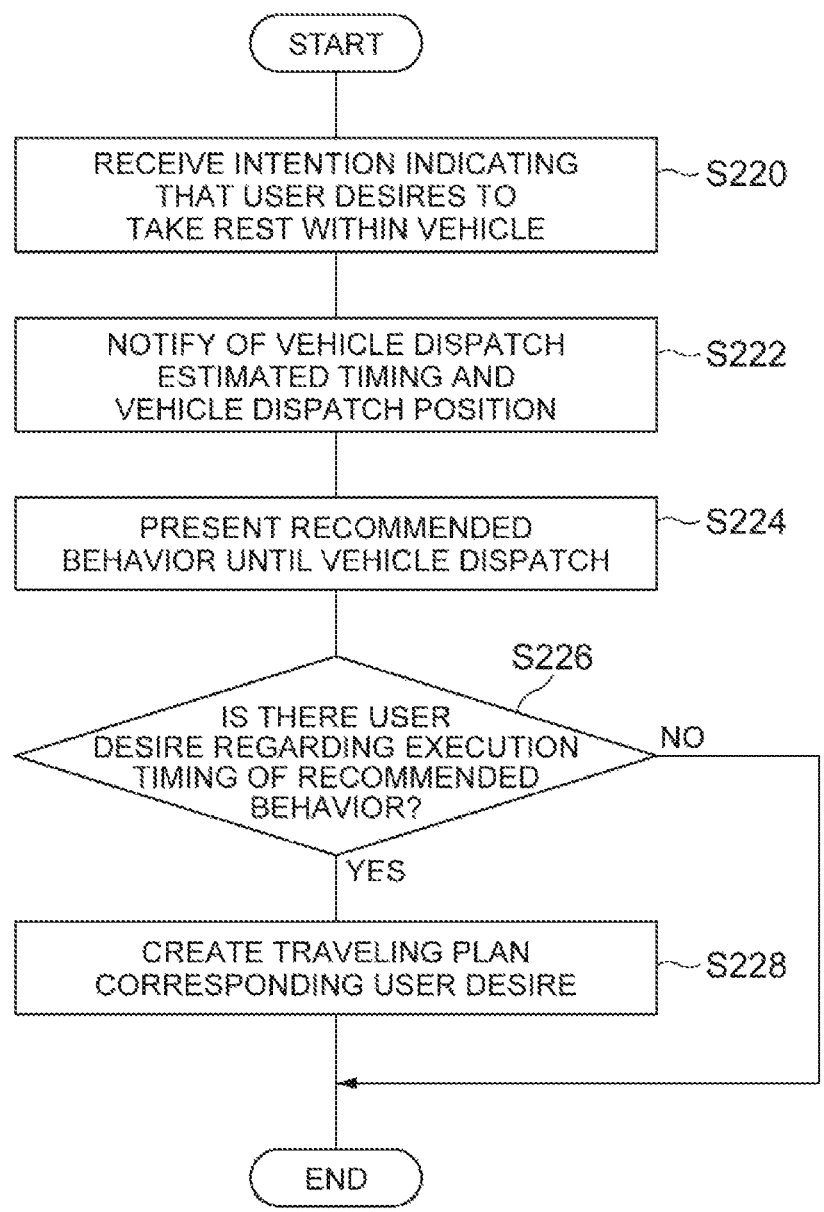
FIG. 18 is a flowchart showing a process performed by the vehicle dispatch management device according to the seventh reference embodiment.

Hereinafter, a process performed by the vehicle dispatch management device 1G will be described. FIG. 18 is a flowchart showing the process performed by the vehicle dispatch management device 1G according to the seventh reference embodiment. The flowchart of FIG. 18 is performed subsequently to step S10 in the flowchart of FIG. 3.

In step S220, any option output through the output device about whether or not the purpose of use of the autonomous driving vehicle is to take a rest within the vehicle is selected by the user, the information regarding the selected option is transmitted to the vehicle dispatch management device 1G from the user terminal 2. Thus, the option reception unit 11G of the vehicle dispatch management device 1G receives the option selected by the user. Here, the option reception unit 11G receives the option indicating that the purpose of use of the autonomous driving vehicle is to take a rest within the vehicle, as the option selected by the user. In other words, the option reception unit 11G receives an intention of the user who desires to take a rest within the vehicle. Thereafter, the vehicle dispatch management device 1G proceeds to step S222.

In step S222, the recommended behavior presentation unit 22G of the vehicle dispatch management device 1G notifies the user of the vehicle dispatch estimated timing and the vehicle dispatch position of the autonomous driving vehicle in order to take a rest within the vehicle. Thereafter, the vehicle dispatch management device 1G proceeds to step S224.

In step S224, the recommended behavior presentation unit 22G of the vehicle dispatch management device 1G presents the recommended behavior recommended to do before the autonomous driving vehicle is dispatched to the user. For example, the presented recommended behavior is determined based on the vehicle dispatch estimated timing and the vehicle dispatch position of the autonomous driving vehicle. Thereafter, the vehicle dispatch management device 1G proceeds to step S226.

In step S226, the information regarding the execution timing of the recommended behavior input by the user on the input screen output (displayed) through the output device is transmitted to the vehicle dispatch management device 1G from the user terminal 2, and thus, the recommended behavior reception unit 23G of the vehicle dispatch management device 1G receives the execution timing of the recommended behavior input by the user.

The recommended behavior reception unit 23G determines whether or not there is the user desire regarding the execution timing of the recommended behavior based on the received information regarding the execution timing. When the recommended behavior reception unit determines that there is the user desire regarding the execution timing of the recommended behavior (step S226: YES), the vehicle dispatch management device 1G proceeds to step S228. Meanwhile, when the recommended behavior reception unit does not determine that there is the user desire regarding the execution timing of the recommended behavior (step S226: NO), the vehicle dispatch management device 1G ends the process of this flowchart without creating the traveling plan corresponding to the user desire.

In step S228, the destination setting unit 18G of the vehicle dispatch management device 1G creates a traveling plan based on the execution timing of the recommended behavior input by the user. When the traveling plan of the autonomous driving vehicle is created, the vehicle dispatch management device 1G ends the process of this flowchart. The autonomous driving vehicle starts to travel through the autonomous driving based on the traveling plan based on the execution timing of the recommended behavior input by the user.

As described above, in accordance with the vehicle dispatch management device 1G according to the seventh reference embodiment, when the autonomous driving vehicle is dispatched in order to take a rest within the vehicle, it is possible to present the recommended behavior recommended to do before the autonomous driving vehicle is dispatched to the user. In this case, when there is the user desire regarding the execution timing of the recommended behavior, the vehicle dispatch management device 1G can create the traveling plan corresponding to the user desire.

The vehicle dispatch management device 1G may end the process of the flowchart without performing the process subsequent to step S226 after the process of step S224 is performed in the flowchart of FIG. 18. That is, the vehicle dispatch management device 1G may not create (change) the traveling plan corresponding to the user desire regarding the execution timing of the recommended behavior after the recommended behavior recommended to do before the autonomous driving vehicle is dispatched is presented to the user.

What is claimed is:

1. A vehicle dispatch management device comprising:
    a vehicle database that stores vehicle information on at least one autonomous driving vehicle; and
    a server connected so as to communicate with a user terminal of a first autonomous driving vehicle, among the at least one autonomous driving vehicle, the server including a processor configured to:
        transmit information regarding an option, of whether a purpose of use of a scheduled autonomous driving vehicle, among the at least one autonomous driving vehicle, is for the user to take a rest within the scheduled autonomous driving vehicle, to the user terminal,
        receive the information regarding the option from the user terminal, the option being selected by the user from the user terminal;
        access the vehicle database and obtain autonomous driving vehicle information including first and second information of the at least one autonomous driving vehicle;
        transmit the first information, which represents a first feature of the at least one autonomous driving vehicle, to the user terminal when the information regarding the option indicates that the purpose of use is not to take a rest within the scheduled autonomous driving vehicle, is received from the user terminal, and transmit the second information, which represents a second feature of the at least one autonomous driving vehicle, to the user terminal when the information regarding the option indicates that the purpose of use is to take a rest within the scheduled autonomous driving vehicle, is received from the user terminal;
        receive a user selection, from the user terminal, of an autonomous driving vehicle candidate, which is an autonomous driving vehicle to be dispatched by the vehicle dispatch management device as the scheduled autonomous driving vehicle, and which is selected based on the respective first information or second information;
        generate an autonomous traveling plan for the autonomous driving vehicle candidate based on the information regarding the option received from the user terminal; and
        dispatch the autonomous driving vehicle candidate as the scheduled autonomous driving vehicle, such that the scheduled autonomous driving vehicle is configured to follow the generated autonomous traveling plan;
    wherein when the option indicates that the purpose of use is to take a rest within the scheduled autonomous driving vehicle, the information regarding the option indicates that the user intends to at least (i) take a rest or stay within the scheduled autonomous driving vehicle before and after the user is moved by the scheduled autonomous driving vehicle or (ii) take a rest or stay within the scheduled autonomous driving vehicle instead of taking a rest or staying in a building such as a home or an accommodation.

2. The vehicle dispatch management device according to claim 1,
    wherein the first information further represents a feature regarding autonomous driving of the at least one autonomous driving vehicle, and the second information further represents a feature regarding a case where the purpose of use is to take a rest within the at least one autonomous driving vehicle.

3. A non-transitory computer-readable storage medium storing a vehicle dispatch management program that when executed on a server including a processor, and connected so as to communicate with a user terminal and a vehicle database that stores vehicle information on at least one autonomous driving vehicle, causes the processor to:
    transmit information regarding an option, of whether a purpose of use of a scheduled autonomous driving vehicle, among the at least one autonomous driving vehicle, is for the user to take a rest within the scheduled autonomous driving vehicle, to the user terminal;
    receive the information regarding the option from the user terminal, the option being selected by the user from the user terminal;
    access the vehicle database and obtain autonomous driving vehicle information including first and second information of the at least one autonomous driving vehicle;
    transmit the first information, which represents a first feature of the at least one autonomous driving vehicle, to the user terminal when the information regarding the option indicates that the purpose of use is not to take a rest within the scheduled autonomous driving vehicle, is received from the user terminal, and transmit the second information, which represents a second feature of the at least one autonomous driving vehicle, to the user terminal when the information regarding the option indicates that the purpose of use is to take a rest within the scheduled autonomous driving vehicle, is received from the user terminal;

receive a user selection, from the user terminal, of an autonomous driving vehicle candidate, which is an autonomous driving vehicle to be dispatched by the vehicle dispatch management program as the scheduled autonomous driving vehicle, and which is selected based on the respective first information or second information;

generate an autonomous traveling plan for the autonomous driving vehicle candidate based on the information regarding the option received from the user terminal; and dispatch the autonomous driving vehicle candidate as the scheduled autonomous driving vehicle, such that the scheduled autonomous driving vehicle is configured to follow the generated autonomous traveling plan;

wherein when the option indicates that the purpose of use is to take a rest within the scheduled autonomous driving vehicle, the information regarding the option indicates that the user intends to at least (i) take a rest or stay within the scheduled autonomous driving vehicle before and after the user is moved by the scheduled autonomous driving vehicle or (ii) take a rest or stay within the scheduled autonomous driving vehicle instead of taking a rest or staying in a building such as a home or an accommodation.

* * * * *